(12) United States Patent
Menner et al.

(10) Patent No.: US 11,897,341 B2
(45) Date of Patent: Feb. 13, 2024

(54) METHOD AND SYSTEM FOR CONTROLLING MOTION OF AN ELECTRIC VEHICLE (EV)

(71) Applicant: Mitsubishi Electric Research Laboratories, Inc., Cambridge, MA (US)

(72) Inventors: Marcel Menner, Cambridge, MA (US); Stefano Di Cairano, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 186 days.

(21) Appl. No.: 17/450,996

(22) Filed: Oct. 15, 2021

(65) Prior Publication Data

US 2023/0120946 A1   Apr. 20, 2023

(51) Int. Cl.
*B60L 15/20*   (2006.01)
*B60K 1/02*    (2006.01)

(52) U.S. Cl.
CPC ....... *B60L 15/2045* (2013.01); *B60L 15/2054* (2013.01); *B60K 1/02* (2013.01); *B60L 2240/12* (2013.01); *B60L 2240/14* (2013.01); *B60L 2240/421* (2013.01); *B60L 2240/423* (2013.01); *B60L 2240/486* (2013.01)

(58) Field of Classification Search
CPC .......... B60L 15/2045; B60L 15/2054; B60L 2240/12; B60L 2240/14; B60L 2240/421; B60L 2240/423; B60L 2240/486; B60L 2240/54; B60L 50/70; B60L 15/38; B60K 1/02; Y02T 10/64; Y02T 10/72
See application file for complete search history.

(56) References Cited

FOREIGN PATENT DOCUMENTS

CN   110758244   2/2020

OTHER PUBLICATIONS

F. Morlock, B. Rolle, M. Bauer and O. Sawodny, "Forecasts of Electric Vehicle Energy Consumption Based on Characteristic Speed Profiles and Real-Time Traffic Data," in IEEE Transactions on Vehicular Technology, vol. 69, No. 2, pp. 1404-1418, Feb. 2020, doi: 10.1109/TVT.2019.2957536. (Year: 2020).*
Machine translation of CN110758244 (Year: 2020).*
Morlock et al. "Forecasts of Electric Vehicle Energy Consumption Based on Characteristic Speed Profiles and Real Time Traffic Data." IEEE Transactions on Vehicular Technology, vol. 69, No. 2, Feb. 2020.

* cited by examiner

*Primary Examiner* — Alan D Hutchinson
(74) *Attorney, Agent, or Firm* — Gene Vinokur

(57) ABSTRACT

Embodiments of the present disclosure disclose a method and a system for controlling a motion of an electric vehicle (EV). The method includes determining a velocity profile moving the EV from an initial velocity over a period of time by minimizing the energy dissipation according to an energy-loss function. The energy-loss function maps values of acceleration and velocity of the EV to energy dissipation of the EV resulting from controlling one or multiple electric motors of the EV to move the EV at corresponding acceleration and velocity values. The velocity profile is a function of time. The method further includes controlling the one or multiple electric motors of the EV to generate a torque for moving the EV according to the velocity profile.

19 Claims, 19 Drawing Sheets

METHOD AND SYSTEM FOR CONTROLLING MOTION OF AN ELECTRIC VEHICLE (EV)

TECHNICAL FIELD

The present disclosure relates generally to optimizing energy efficiency of electric vehicles, and more specifically to a method and system for controlling motion of an electric vehicle (EV).

BACKGROUND

EVs are vehicles powered by electrical energy, which is a renewable energy source. Improving energy efficiency improves an EV's range and make an EV cheaper to operate, more environment-friendly, and attractive to a broader range of users. An EV may use a battery pack and one or multiple electric motors for propulsion instead of an internal combustion engine. The battery pack stores electrical energy that powers the one or multiple motors to drive the EV. Nowadays, the EVs are gaining popularity due to their potential to reduce operational costs of automobiles as well as to reduce pollutant emissions of the automobiles. In some cases, the EV may correspond to a hybrid electric vehicle (HEV) that uses an internal combustion engine in combination with one or multiple electric motors. The dynamics of the internal combustion engine and the dynamics of the electric motors may vary. For instance, the electric motors may produce high torque, whereas the internal combustion engine may reach that high torque after gaining speed. The combustion engine may be slower than the electric motors, which may constrain control operation of the EV.

The EV may use a transmission, such as a continuously variable transmission (CVT) that converts power supplied by the one or multiple electric motors to momentum for driving wheels of the EV. The CVT is a type of transmission that seamlessly changes a gear regardless of the speed of the EV. However, such transmission in the EV may impact efficiency of the electric motors. The efficiency of the electric motors corresponds to a difference between a mechanical power output of the electric motors and electrical energy consumed by the electric motors. Typically, the mechanical power output is lower than the electrical energy consumed due to loss of energy during conversion of the electrical energy to the mechanical energy. This loss of energy may be higher when the transmission, such as the CVT is used for changing the gear, thereby reducing the efficiency of the electric motors. Further, the efficiency of the electric motors may be impacted by different types of the electric motors and by varying torque demand for moving the EV. For instance, one of the electric motors may correspond to a powerful electric motor and another may correspond to a weaker electric motor, whose efficiencies vary based on the torque demand. The weaker electric motor may have a low torque demand and the powerful electric motor may have a high torque demand.

Accordingly, there is a need to overcome the above-mentioned problem. More specifically, there is need to develop a method and system for controlling the electric vehicle in an efficient and feasible manner.

SUMMARY

An EV, such as a battery-powered EV may use one or multiple electric motors to operate the EV. An electric motor may have an efficiency which is a function of torque and rotational speed of the electric motor. When the electric motor operates to achieve desired torque and rotational speed for moving the EV, there may be loss of energy that impacts the efficiency of the electric motor. The impact on the electric motor efficiency may further affect an energy-efficient control of the EV.

To that end, it is an object of some embodiments to use an energy-loss function in order to minimize the energy loss of the EV. The energy-loss function is a cost function that may be derived from a tabulated data of an efficiency map of the electric motor. The efficiency map may include a contour plot that determines the maximum efficiency of the electric motor for any combination of torque and a rotational speed of the electric motor. The cost function may include a pseudo-convex loss function that may be optimized for an energy-efficient control of the EV.

In particular, the pseudo-convex loss function may include energy losses of the EV that may correspond to velocity and acceleration of the EV. The energy losses include amount of dissipated energy that may not be recuperated. For example, the energy losses by the one or multiple electric motors resulting from efficiencies are dissipated and are irrecoverable. The energy losses of the EV may also include driving losses and electric motor losses of the EV. The driving losses may correspond to energy losses resulting from rolling resistance or from aerodynamic drag while driving the EV. The electric motor losses correspond to energy losses resulting from operation of the one or multiple electric motors by efficiencies of the electric motors. In some cases, energy used to accelerate the EV may be recuperated when the EV decelerates by operating the one or multiple electric motors in a generator mode. The generator mode corresponds to regenerating energy through deceleration of the EV.

It is also an objective of some embodiments to optimize the efficiency by using degrees of freedom of the EV. In particular, the efficiency of the one or multiple electric motors may be optimized by using the degrees of freedom. The degrees of freedom herein correspond to parameters of the EV, such as torque-split ratio, transmission gear ratio and/or velocity profile of the EV. The torque-split ratio corresponds to allocation of corresponding torque among the one or multiple electric motors. For example, an EV with four in-wheel electric motors may allocate or split a total torque demand among the four electric motors of the EV. The transmission gear ratio corresponds to a gear ratio for controlling transmissions of the EV. The velocity profile corresponds to braking and accelerating maneuvers tracked by the EV.

Some embodiments are based on the realization that the velocity profile tracked by the EV may impact the energy losses. To that end, some embodiments use the energy-loss function to compute the velocity profile for minimizing the energy loss of the EV. The velocity profile may include an initial velocity (i.e., a current velocity) of the EV and a target velocity for the EV. The current velocity may be determined using one or multiple sensors of the EV. The target velocity may be determined based on a motion plan of the EV and a period of time allocated for the velocity profile. In some embodiments, the velocity profile may be determined based on at least one or more of a constraint on an average velocity of the velocity profile, a current position and a current velocity of a leading vehicle driving ahead of the EV, and the current position, the current velocity, and a predicted velocity over a period of time of the leading vehicle driving ahead of the EV. The velocity profile and the initial velocity may be recomputed at every sampling time step of an implementation of the energy-efficient control of the EV.

In some embodiments, the gear ratio may be determined using a predetermined motor efficiency function. The predetermined motor efficiency function may be learned using a kernel-based regression that fits data of the efficiency map of one electric motor relating the efficiency of the electric motor to a motor speed and a motor torque. The kernel-based regression may also fit data of one or multiple efficiency maps of the one or multiple electric motors to the energy-loss function based on a model of drivetrain losses of the one or multiple electric motors and a model of driving losses caused by the aerodynamics and rolling resistance of the EV. The model of drivetrain losses includes losses corresponding to efficiencies of using energy and regeneration of energy from the acceleration and deceleration of the EV. More specifically, the kernel-based regression learns the pseudo-convex loss function having a global minimum, i.e., a smallest overall value in the data of the one or multiple efficiency maps. In some embodiments, the global minimum may be determined using a gradient-descent method. The gradient-descent method is an iterative optimization approach.

Additionally or alternatively, some embodiments may use a predetermined torque-split function for allocating the total torque among the one or multiple motors. In some embodiments, the predetermined torque-split function may be learned using the predetermined motor efficiency function of the one or multiple electric motors.

In some embodiments, a torque profile for the one or multiple electric motors may be determined for moving the EV according to the velocity profile. The torque profile may be determined using a model corresponding to a longitudinal motion of the EV. The model of longitudinal motion relates the acceleration and velocity of the EV with a total torque of the EV. The total torque may be generated according to the torque profile by controlling the one or multiple electric motors. In some cases, the torque profile may split for each of the one or multiple electric motors. For instance, the torque profile may split into a first torque profile for a first electric motor of the one or multiple electric motors and a second torque profile for a second electric motor of the one or multiple electric motors.

Additionally or alternatively, the energy-loss function may be derived from at least the predetermined motor efficiency function, the predetermined torque-split function and the model of the longitudinal motion of the EV.

Additionally or alternatively, the energy-loss function may be optimized using a gradient-descent method. The gradient-descent method is an iterative optimization approach for determining a local minimum, i.e., a suboptimal value of the energy-loss function. In some embodiments, the energy efficiency of the EVs may be controlled based on a sequence of control inputs and an automatic feedback control mechanism for the EV. The sequence of control inputs may correspond to torque and gear ratio commands for the energy-efficient control of the EV. The automatic feedback control may include using a feedback signal that includes a sequence of measurements that may be indicative of states corresponding to the sequence of control inputs. In some example embodiments, a feedback controller may be to used to determine, at each control step, a current control input of the sequence of control inputs for controlling the energy efficiency of the EV based on the feedback signal. The feedback signal may include a current measurement of a current state of a corresponding sequence of control inputs. The feedback controller may apply a control policy for transforming the current measurement into the current control input based on current values of control parameters in a set of control parameters of the feedback controller. Further, a state of the feedback controller defined by the control parameters may be updated in iterative manner by a Kalman filter that uses a prediction model for predicting values of the control parameters subject to process noise. The predicted values may be updated based on a measurement model based on the sequence of measurements. The updated predicted values are used for determining the current values of the control parameters that explain the sequence of measurements according to a performance objective.

Additionally or alternatively, in some embodiments, the Kalman filter is used to update the velocity profile using the energy loss function. Specifically, in response to receiving a feedback signal indicative of a current state of the vehicle tracking the velocity profile, some embodiments execute a Kalman filter to update the velocity profile for the current state of the vehicle improving a likelihood of energy efficiency according to a probabilistic measurement model including the energy loss function. This is advantageous because the energy loss function is deterministic, while the vehicle control is probabilistic in nature. Using the probabilistic measurement model including the deterministic energy loss function modified, for example, with probabilistic noise can reflect the nature of the control, improve the efficiency of determining or updating the velocity profile, and consider imperfections of estimation of the energy loss function.

Accordingly, one embodiment discloses a computer-implemented method for controlling a motion of an electric vehicle. The method uses a processor coupled to a memory storing an energy-loss function mapping values of acceleration and velocity of the EV to energy dissipation of the EV resulting from controlling one or multiple electric motors and/or one or multiple transmissions of the EV to move the EV at corresponding acceleration and velocity values. The processor is configured to execute stored instructions in the memory for implementing the method. The instructions, when executed by the processor carry out steps of the method that include determining a velocity profile moving the EV from an initial velocity over a period of time by minimizing the energy dissipation according to the energy-loss function, wherein the velocity profile is a function of time; and controlling the one or multiple electric motors and/or the one or multiple transmissions of the EV to generate a torque for moving the EV according to the velocity profile.

Accordingly, another embodiment discloses a system for controlling a motion of an electric vehicle. The system includes a processor coupled to a memory storing an energy-loss function mapping values of acceleration and velocity of the EV to energy dissipation of the EV resulting from controlling one or multiple electric motors of the EV to move the EV at corresponding acceleration and velocity values. The processor is configured to execute stored instructions in the memory to determine a velocity profile moving the EV from an initial velocity over a period of time by minimizing the energy dissipation according to the energy-loss function, wherein the velocity profile is a function of time; and control the one or multiple electric motors of the EV to generate a torque for moving the EV according to the velocity profile.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example", "for instance", and "such as", and the verbs "comprising", "having", "including", and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
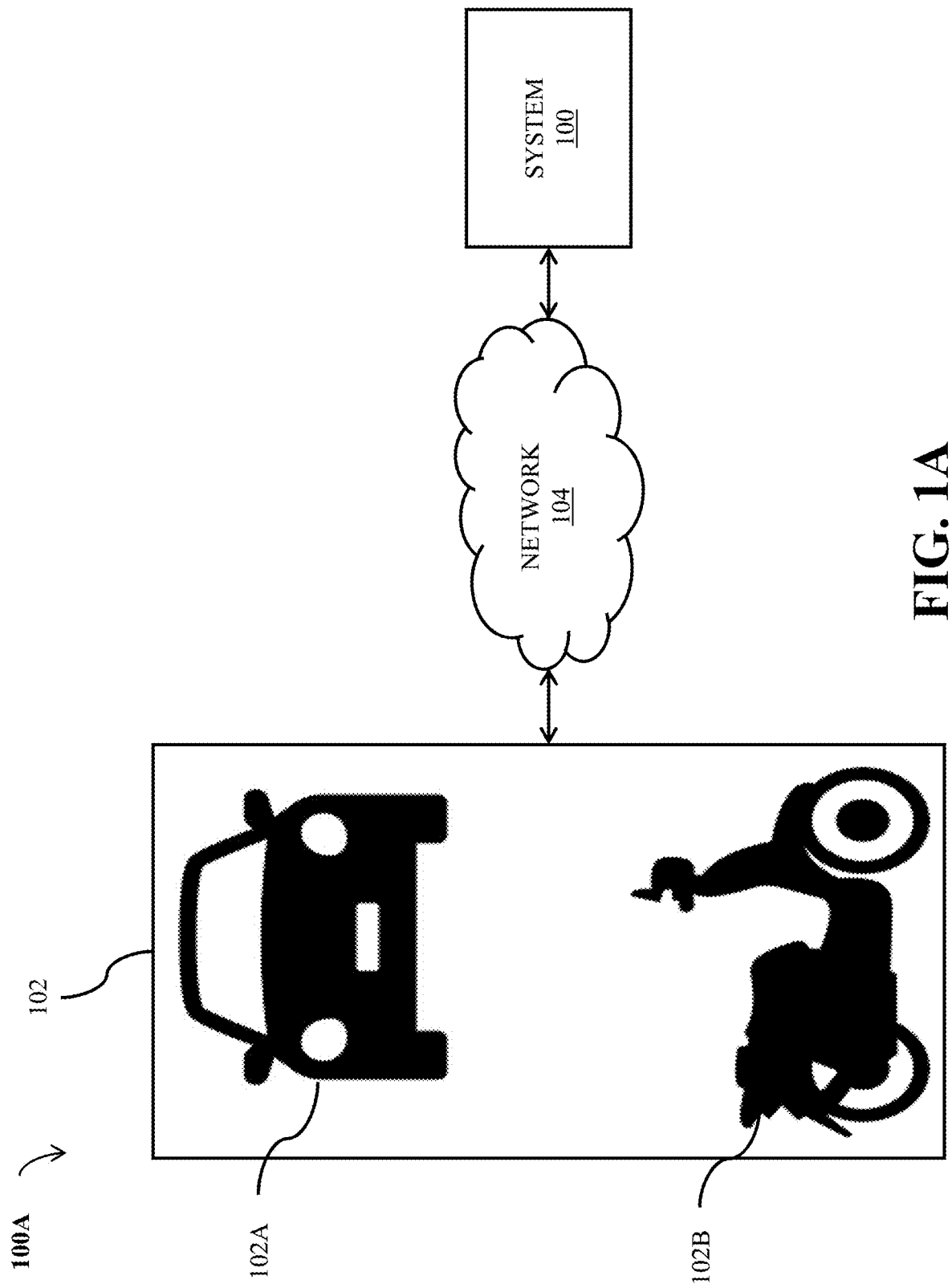
FIG. 1A illustrates an environment of a system for controlling a motion of an electric vehicle (EV), according to some embodiments of the present disclosure.

FIG. 1A illustrates an environment 100A of a system 100 for controlling motion of an electric vehicle (EV) 102, according to embodiments of the present disclosure. The EV 102 may correspond to a battery-operated EV, such as a four-wheeled electric vehicle 102A (e.g., an electric car), a two-wheeled electric vehicle 102B (e.g., an electric bike) or the like. The EV 102 may be operated by one or multiple electric motors. Each of the one or multiple electric motors may exhibit a corresponding efficiency that varies as a function of a torque and a rotation speed of corresponding one or multiple electric motors. To that end, the efficiency of the corresponding one or multiple electric motors can be optimized by using a system 100 for energy-efficient control of the EV 102.

In some example embodiments, the EV 102 may be connected to the system 100 via a network 104. The network 104 may include a wired network, wireless network, or the like. In some other example embodiments, the system 100 may be integrated to a controller or a control unit (not shown) of the EV 102. The system 100 is further described next in FIG. 1B.

Figure 1B:
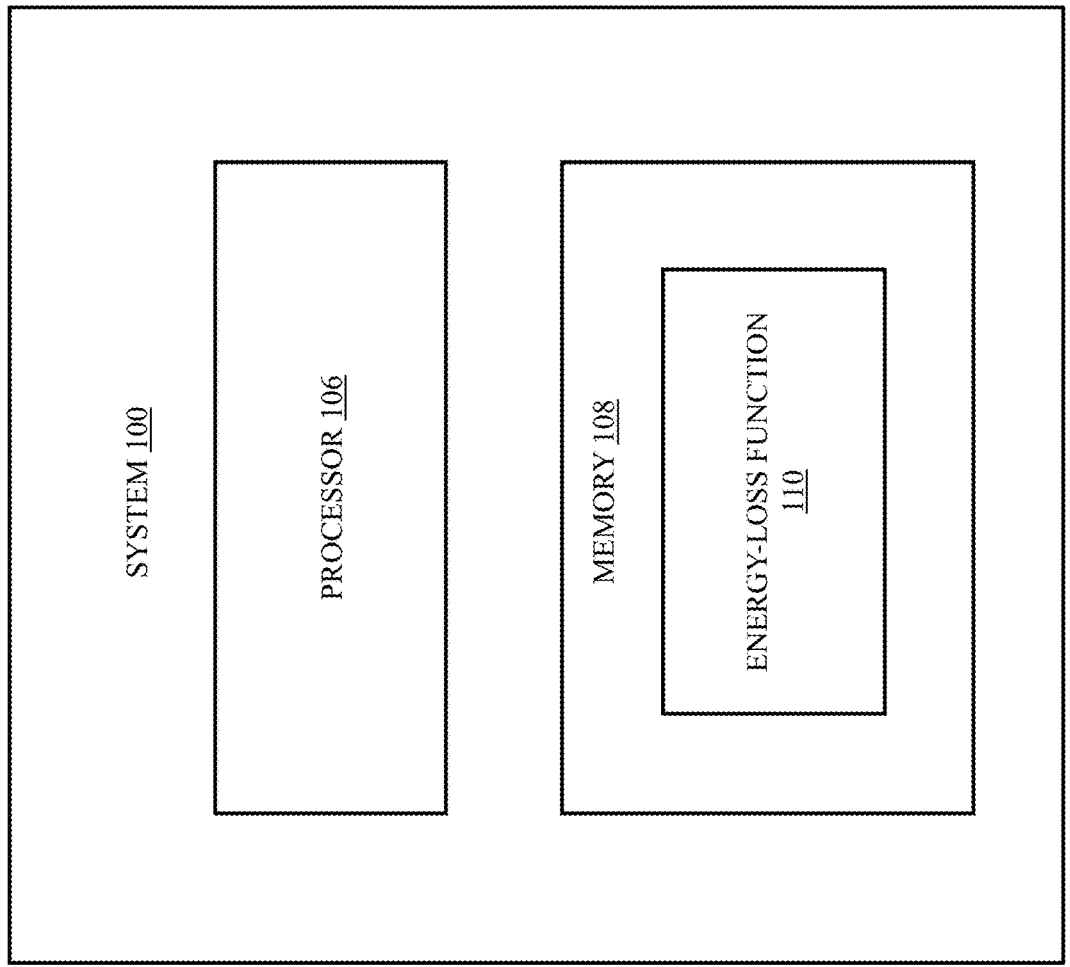
FIG. 1B shows a block diagram of the system for controlling the motion of the EV, according to some embodiments of the present disclosure.

FIG. 1B shows a block diagram 100B of the system 100 for controlling the motion of the EV 102, according to some embodiments of the present disclosure.

The system 100 includes a processor 106 and a memory 108 storing an energy-loss function 110. The energy-loss function 110 maps values of acceleration and velocity of the EV 102 to an energy dissipation of the EV 102. The energy dissipation results from controlling the one or multiple electric motors of the EV 102 to move the EV 102 at corresponding acceleration and velocity values. The processor 106 is configured to execute stored instructions in the memory 108 to cause the system 100 to determine a velocity profile for moving the EV 102 from an initial velocity over a period of time. The velocity profile is a function of time that may be determined by minimizing the energy dissipation according to the energy-loss function 110.

In some example embodiments, the initial velocity is determined as a current velocity of the EV 102. The current velocity may be estimated using one or multiple sensors of the EV 102. The one or multiple sensors may include an accelerometer, a gyroscope, a global positioning system (GPS), a velocity sensor, a wheel speed sensor, or the like. Some embodiments are based on the realization that recomputation using sensor data can provide energy efficient motion control to the EV. To that end, the initial velocity and the velocity profile may be recomputed at every sampling time. The sampling time may correspond to a time duration that the initial velocity and the velocity profile are sampled for the energy-efficient control of the EV 102. Such recomputed initial velocity and the velocity profile can improve accuracy for controlling the motion of the EV 102 with efficient energy consumption.

The processor 106 is further configured to cause the system 100 to control the one or multiple electric motors of the EV 102 to generate a torque for moving the EV 102 according to the velocity profile. The EV 102 may be moved from the initial velocity to a target velocity of the velocity profile. The target velocity may be determined based on a motion plan of the EV 102 and a period of time allocated for the velocity profile.

Figure 2:
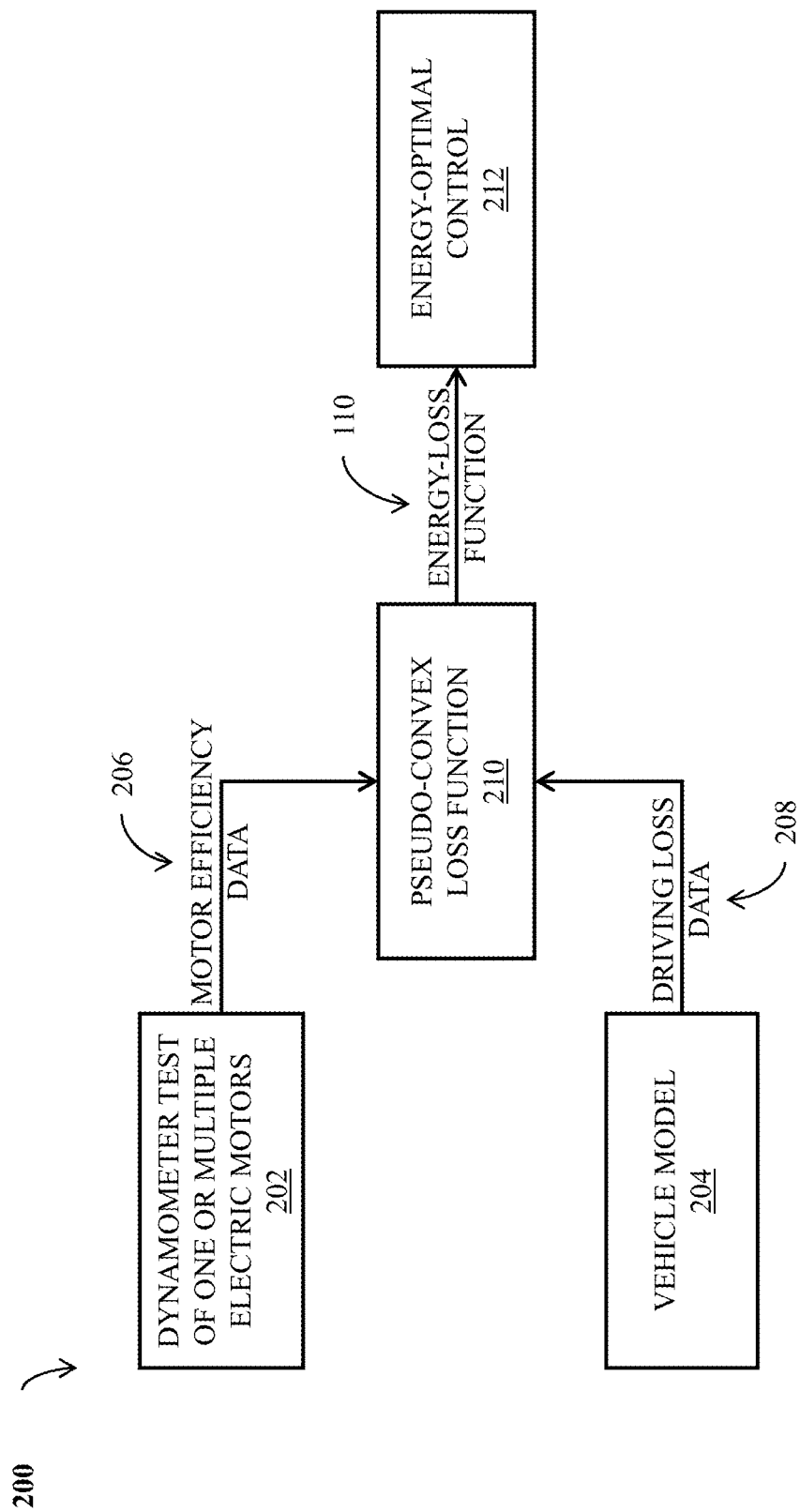
FIG. 2 shows a schematic diagram depicting a procedure for controlling a motion of the EV, according to some embodiments of the present disclosure.

The procedure for controlling the motion of the EV 102 using the system 100 is described further with reference to FIG. 2.

FIG. 2 shows a schematic diagram depicting a procedure 200 for controlling the motion of the EV 102, according to some embodiments of the present disclosure.

In some example embodiments, the system 100 may obtain motor efficiency data 206 of the one or multiple electric motors of the EV 102. The motor efficiency data 206 may be obtained from a dynamometer test 202 of the one or multiple electric motors of the EV 102. The dynamometer test 202 may correspond to a set of experiments where the one or multiple electric motors are tested at a specific constant speed and a specific constant torque, a high acceleration aggressive driving schedule (US06) test, an Urban Dynamometer Driving Schedule (UDDS) test, or the like. The motor efficiency data 206 may be used for learning a pseudo-convex loss function 210. The pseudo-convex loss function 210 is a cost function that may be obtained from driving loss data 208. The driving loss data 208 may be obtained from a vehicle model 204 corresponding to driving losses of the EV 102 or from testing the EV 102 on a testbed. The driving losses include energy losses resulting from an aerodynamic drag and a rolling resistance of the EV 102.

In some embodiments, the pseudo-convex loss function 210 includes both driving modes of using energy for accelerating the EV 102 and regenerating energy during decelerating the EV 102. The pseudo-convex loss function 210 includes a pseudo-convex shape that enables differentiability of the energy losses in the motor efficiency data 206, which makes the system 100 feasible for a real-time energy-optimal control 212 of the EV 102.

To that end, the system 100 may minimize the energy losses of the EV 102 using velocity profile and enable the energy-optimal control 212. The minimization of the energy losses based on the velocity profile is described further with reference to FIG. 3.

Figure 3:
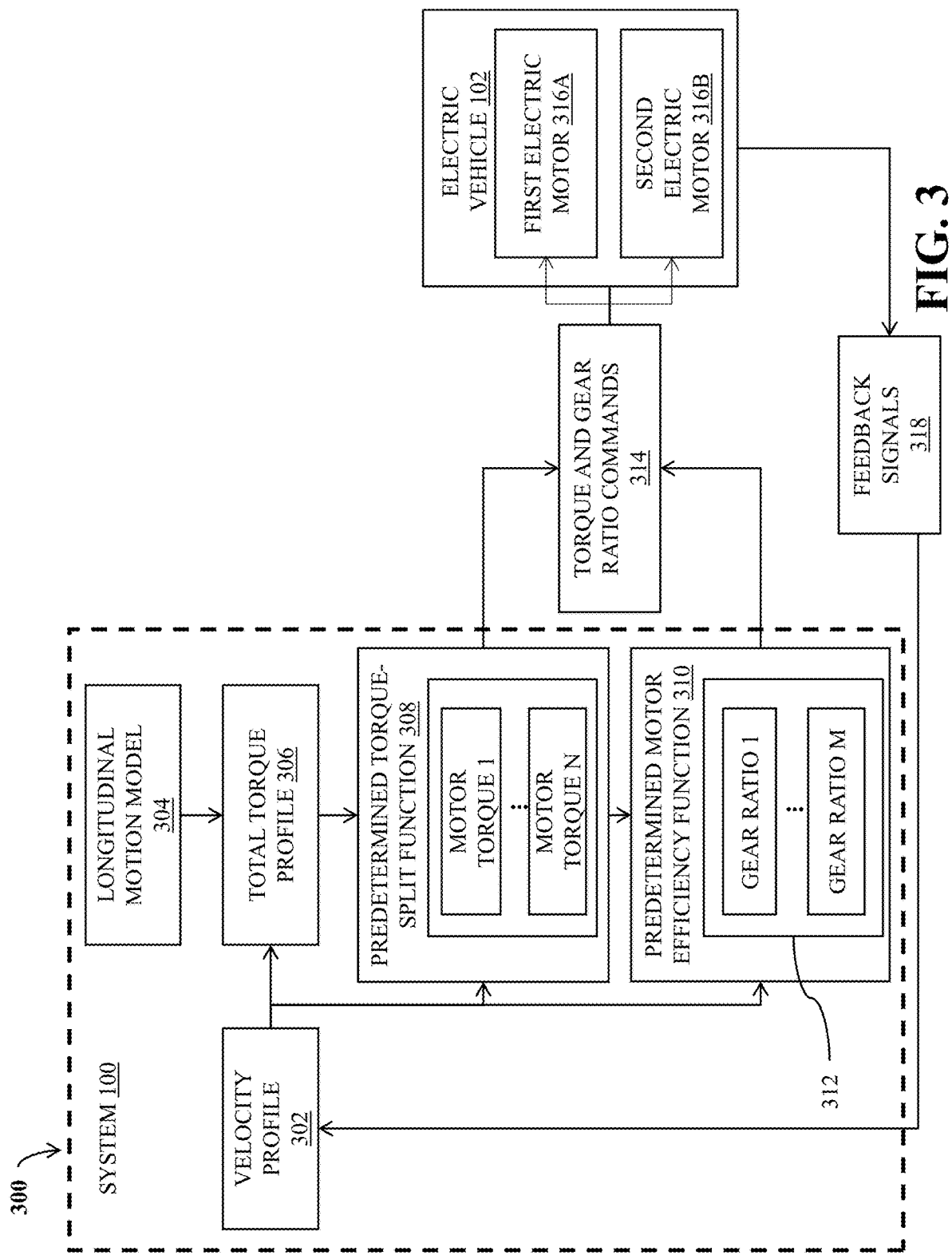
FIG. 3 shows a schematic diagram depicting a procedure for controlling a motion of the EV, according to some other embodiments of the present disclosure.

FIG. 3 shows a schematic diagram depicting of a procedure 300 for controlling a motion of the EV 102, according to some other embodiments of the present disclosure. The procedure 300 is performed by the system 100 to minimize efficiency of the one or multiple electric motors using degrees of freedom of the EV 102. The degrees of freedom include a velocity profile 302, a total torque profile 306, and a gear ratio 312. The velocity profile 302 is determined using the energy-loss function 110. The velocity profile 302 is a function of time corresponding to braking and acceleration maneuvers tracked by the EV 102. The acceleration is a time-derivative of velocity of the EV 102, which implies values for the acceleration of the EV 102.

The total torque profile 306 is determined using a model for the longitudinal motion 304 of the EV 102 (referred to hereinafter as "longitudinal motion model 304"). The longitudinal motion model 304 relates the acceleration and velocity of the EV 102 with a total torque of the EV 102.

Further, the gear ratio 312 may be determined from the velocity profile 302 and the total torque profile 306 using a predetermined motor efficiency function 310. The gear ratio 312 is used for a transmission of the one or multiple electric motors. For example, the gear ratio $q^*_{i,k}{}^\star$ may be obtained by optimizing the efficiency of the electric motor i driving the transmission:

$$q^*_{i,k} = \mathrm{argmax}_{\tilde{q}} \eta_i \left( \tilde{q} \frac{v^*_k}{r_{wheel}}, \frac{1}{\tilde{q}} \tau^{wheel}_{i,k} \right) \forall\, i = 1, \ldots, m, \tag{1}$$

where m is a number of the transmissions of the EV 102, $\eta_i(\omega_{i,k}, \tau_{i,k})$ is the efficiency function of the electric motor driving the transmission i as function of the motor speed $\omega_{i,k}$ and the motor torque $\tau_{i,k}$.

In some embodiments, the longitudinal motion model 304 may be determined based on Newtonian mechanics such as, $$ma_k = -F_{drag}(v_k) - F_{roll}(v_k) + \frac{T_k}{r_{wheel}} \tag{2}$$

where m is mass of the EV 102,
$r_{wheel}$ is wheel radius of wheels of the EV 102,
$F_{drag}(v_k)$ is a force resulting from the aerodynamic drag of the EV 102, and $(F_{roll}(v_k))$ is a force resulting from the rolling resistance of the EV 102.

The longitudinal motion model 304 may be determined based on parameters, such as road grade that the EV 102 is travelling, wheels of different radii of the EV 102, and the like. The longitudinal motion model 304 relates the total torque of the EV102 ($T_k$) and the velocity of the EV 012 ($v_k$) with the acceleration of the EV 102 ($a_k$).

In some example embodiments, the total torque profile 306 is allocated to the one or multiple electric motors for moving the EV 102 according to the velocity profile 302. The total torque profile 306 is allocated among the one or multiple electric motors based on a predetermined torque-split function 308. The total torque profile 306 is split into motor torque 1, motor torque N, or the like for 'N' number of multiple electric motors of the EV 102. For instance, the EV 102 may use first electric motor 316A and a second electric motor 316B. The total torque profile 306 may be allocated into a first torque profile for the first electric motor 316A and a second torque profile for the second electric motor 316B.

In some embodiments, the energy-loss function 110 may be used for driving losses such as aerodynamic drag and rolling resistance of the EV 102. The aerodynamic drag may be modeled based on following equation, $$F_{drag}(v_k) = 0.5 \rho c_{drag} A_{drag} v_k^2 \tag{3}$$

where $A_{drag}$ is a frontal area, $c_{drag}$ is a drag coefficient, and $\rho$ is an air density.

The rolling resistance may be modeled based on following equation, $$F_{roll}(v_k) = c_{roll} mg \cdot sign(v_k) \tag{4}$$

where $c_{roll}$ is a rolling coefficient and g is a gravitational constant.

Further, relationship between rotational speeds of the one or multiple electric motors of the EV 102, the velocity of the EV 102, and the gear ratio 312, may be represented as $$v_k = \omega_{1,k} \frac{r_{wheel}}{q_{1,k}} = \ldots = \omega_{m,k} \frac{r_{wheel}}{q_{m,k}} \quad (5)$$

where $\omega_{i,k}$ is a motor speed of one electric motor (i) of the EV 102 and $q_{i,k}$ is the gear ratio 312 between the electric motor i and wheels of the EV 102.

In some cases, the EV 102 may use multiple electric motors. In such cases, relationship between the total torque and motor torques at the wheels of the multiple electric motors may be represented as, $$T_k = \sum_{i=1}^{n} \tau_{i,k}^{wheel} \quad (6)$$

where $\tau_{i,k}^{wheel}$ is a torque at the wheel of the EV 102 resulting from the electric motor i and n is the number of electric motors.

In some embodiments, the velocity profile 302 and the longitudinal motion model 304 may be used to determine the total torque profile 306. For example, the total torque profile 306 may result from (1) and determined by, $$T_k = (ma_k + F_{drag}(v_k) + F_{roll}(v_k)) r_{wheel} \quad (7)$$

Figure 5A:
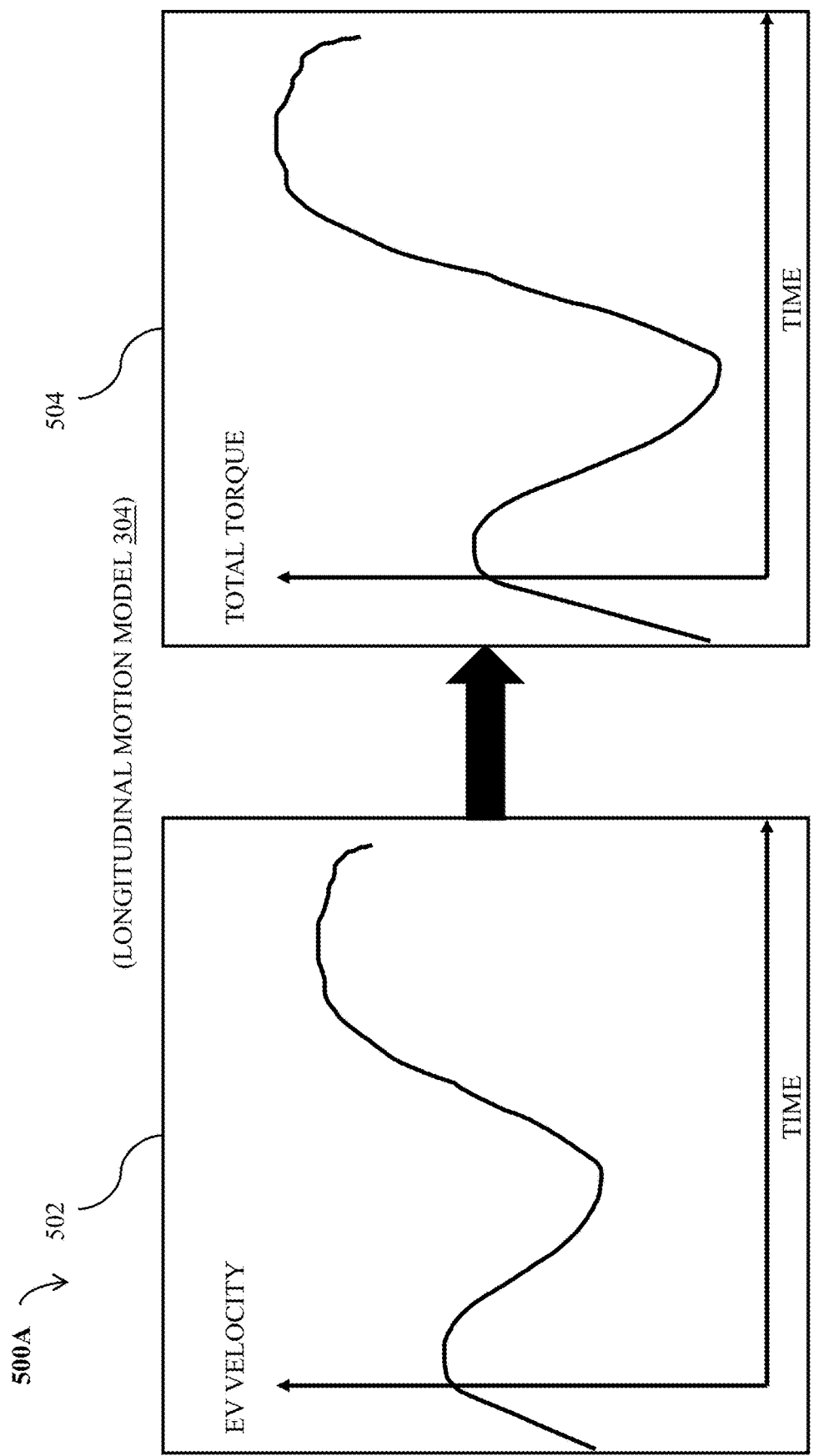
FIG. 5A shows an exemplary graphical representation depicting a graphical plot corresponding to a velocity profile of the EV and a graphical plot corresponding to a total torque profile of the EV, according to some embodiments of the present disclosure.

Such total torque profile 306 is shown as a graphical plot in FIG. 5A.

Furthermore, in order to control the longitudinal motion of the EV 102, the system 100 sends torque and gear ratio commands 314 with the motor torques $\tau_{i,k} = \tau_{i,k}^{wheel}/q_{i,k}$ for all electric motors (i=1, ..., n) of the EV 102, where $q_{i,k}$ denotes the gear ratio 312 between the electric motors i and the wheels of the EV 102.

In some example embodiments, the system 100 may control the longitudinal motion of the EV 102 by using feedback signals 318. The feedback signals 318 may include information corresponding to the EV 102 and a vehicle driving ahead of the EV 102, which is described further with reference to FIG. 4 in conjunction with FIG. 3.

Figure 4:
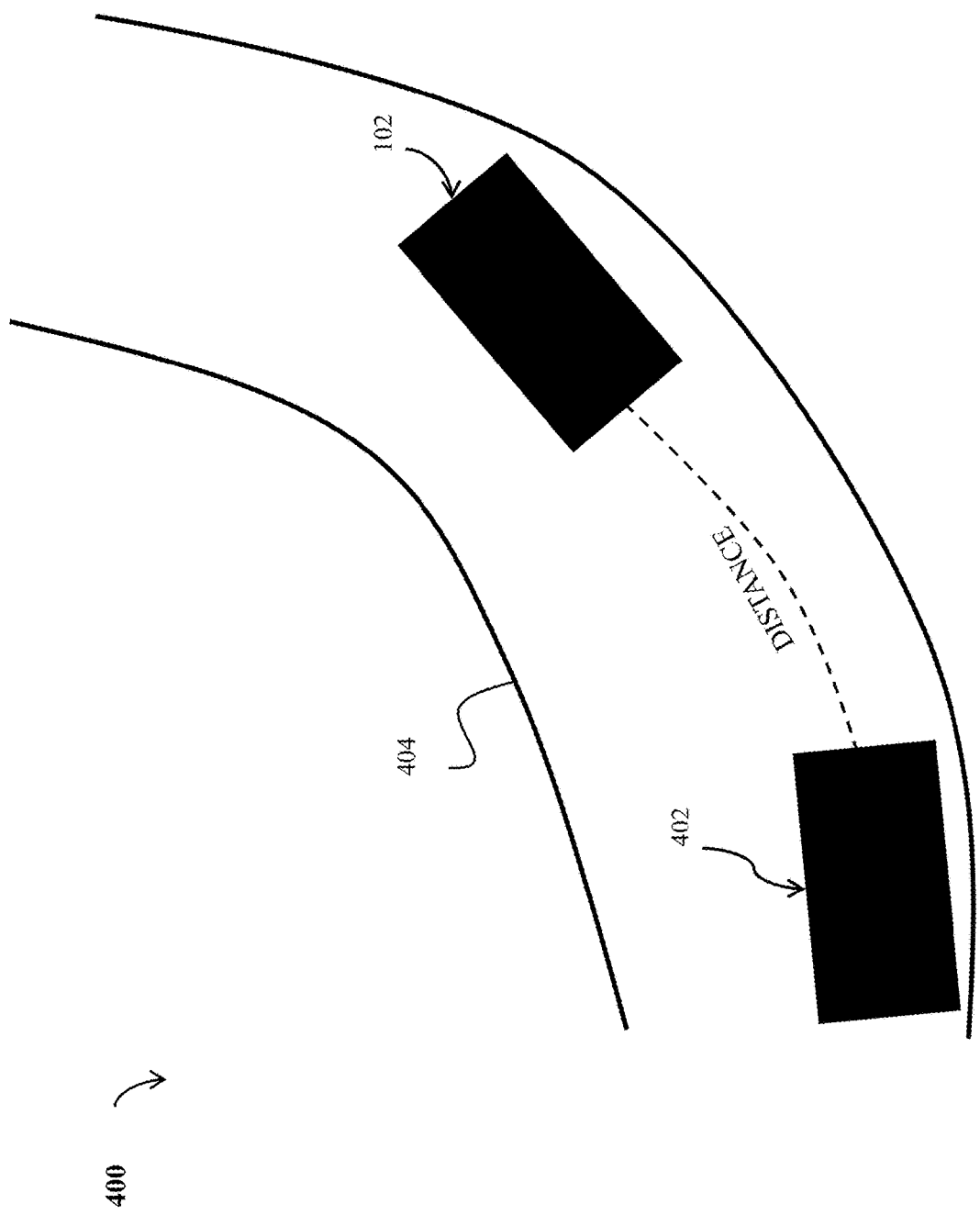
FIG. 4 illustrates an exemplary scenario depicting an EV and a vehicle driving ahead of the EV on a road, according to some embodiments of the present disclosure.

FIG. 4 illustrates an exemplary scenario 400 depicting the EV 102 and a vehicle 402 driving ahead of the EV 102 on a road 404, according to some embodiments of the present disclosure. The EV 102 and the vehicle 402 are driving on a road 404. The vehicle 402 may include a fully EV, a fuel-driven vehicle, or the like that may be autonomous, a semi-autonomous or manually operated.

In some embodiments, the velocity profile 302 may be determined based on one or more of a constraint on an average velocity of the velocity profile 302, a current position of the vehicle 402 and/or a current velocity of the vehicle 402. In some other embodiments, the velocity profile 302 may be determined based on the current position, the current velocity, and a predicted velocity over a period of time of the vehicle 402. To that end, the efficiency of the one or multiple electric motors may be optimized using an automatic feedback control. The automatic feedback control corresponds to the feedback signals 318 from the EV 102 that may include a current velocity of the EV 102, a current position of the EV 102, a current velocity of the vehicle 402, the position of the vehicle 402 driving, and the like.

The energy-loss function 110 may be optimized, for example, as $$v_0^\star, \ldots, v_{N_{VP}}^\star = \arg\min \Sigma_{k=0}^{N_{VP}} L_{EV}(v_k, a_k)$$

$$s.t. \quad v_{k+1} = v_k + T_s a_k \quad \forall k=0, \ldots N_{VP}$$

$$d_{k+1} = d_k + T_s v_k \quad \forall k=0, \ldots N_{VP}$$

$$c_{VP}(d_k, v_k, a_k, z_k) \le 0 \quad \forall k=0, \ldots N_{VP}$$

$$c_{VP}(d_k, v_k, a_k, z_k) \le 0 \quad \forall k=0, \ldots N_{VP}$$

$$v_0 = v(t) \quad (8)$$

where $d_k$ is a traveled distance by the EV 102, $L_{EV}$ is the energy-loss function 110, $N_{VP}$ is a prediction horizon of determined the velocity profile 302, v(t) is a current velocity of the EV, and $z_k$ may include the feedback signals 318 of the vehicle 402 such as a traveled distance of the vehicle 402 ($d_k^{LV}$) or a velocity of the vehicle 402 ($v_k^{LV}$).

The velocity profile 302 may be optimized in (8) using inequality constraints ($c_{VP}(d_k, v_k, a_k, z_k) \le 0$) or equality constraints ($c_{eq,VP}(d_k, v_k, a_k, z_k) = 0$), or both, to attain certain properties for minimizing energy-loss of the EV 102, which may be denoted as, $$v_0^\star, \ldots, v_{N_{VP}}^\star \quad (9)$$

where $v_0^\star, \ldots, v_{N_{VP}}^\star$ is the velocity profile 302 from time 0 through time $N_{VP}$.

For example, inequality constraints ($c_{VP}(d_k, v_k, a_k, z_k) \le 0$) may be used to attain that a maximum velocity of the EV 102 is not exceeded with $$c_{VP}(d_k, v_k, a_k, z_k) = v_k - v_{max} \le 0 \quad \forall k=1, \ldots, N_{VP} \quad (10)$$

where $v_{max}$ is the maximum velocity. The inequality constraints $c_{vp}(d_k, v_k, a_k, z_k) \le 0$ may also be used to attain that a maximum acceleration of the EV 102 is not exceeded with $$c_{VP}(d_k, v_k, a_k, z_k) = a_k - a_{max} \le 0 \quad \forall k=1, \ldots, N_{VP} \quad (11)$$

where $a_{max}$ is the maximum acceleration. Further, the inequality constraints $c_{VP}(d_k, v_k, a_k, z_k) \le 0$ may be used to attain a minimum average velocity for the EV 102 with $$c_{VP}(d_k, v_k, a_k, z_k) = v_{average} - \frac{1}{N_{VP}} \sum_{k=1}^{N_{VP}} v_k \le 0 \quad (12)$$

where $v_{average}$ is the average velocity of the velocity profile 302. The inequality constraints $c_{vp}(d_k, v_k, a_k, z_k) \le 0$ may also be used to attain that the EV 102 arrives to a complete stop within a stopping distance with $$c_{VP}(d_k, v_k, a_k, z_k) = d_k - d_{stop} \le 0 \quad \forall k=1, \ldots, N_{VP}; \quad (13)$$

where $d_{stop}$ is the stopping distance. The inequality constraints $c_{VP}(d_k, v_k, a_k, d_k^{LV}, v_k^{LV}) \le 0$ may also be used to maintains a safe distance between the EV 102 and the vehicle 402 with $$c_{VP}(d_k, v_k, a_k, z_k) = d_k - (d_k^{LV} + T_{hw} v_k^{LV}) \le 0 \quad \forall k=1, \ldots, N_{VP} \quad (14)$$

where $T_{hw}$ is a headway time for maintaining a safe distance between the EV 102 and the vehicle 402. The headway time increases the safe distance as the velocity of the vehicle 402 increases.

Further, the equality constraint $c_{eq,VP}(d_k, v_k, a_k, z_k) = 0$ in (8) may be used to achieve a target velocity at any or all points within a horizontal length of the velocity profile 302. In some example embodiments, the target velocity may be determined based on a motion plan of the EV 102 and a period of time allocated for the velocity profile 302. The target velocity is at end of the velocity profile 302. In order to achieve the target velocity ($v_{target}$) at the period of time (k), the velocity profile 302 may be constrained as, $$c_{eq,VP}(d_k, v_k, a_k) = v_{target} - v_k = 0 \text{ for some } k \in \{1, \ldots, N_{VP}\} \quad (15)$$

For example, if the EV 102 has to stop at the target velocity of the velocity profile 302, then the velocity profile 302 is constrained as, $c_{eq,VP}(d_k, v_k, a_k) = 0 - v_{N_{vp}} = 0$. If the EV 102 has to stop at a specific location, e.g., at a stop sign and a specific time, then the velocity profile 302 is constrained as, $$c_{eq,VP}(d_k, v_k, a_k) = d_{target} - d_k = 0 \text{ for some } k \in \{1, \ldots, N_{VP}\} \quad (16)$$

The velocity profile 302, the total torque profile 306 and the gear ratio 312 are shown in FIGS. 5A, 5B, 5C and 5D.

FIG. 5A shows a graphical representation 500A depicting a graphical plot 502 corresponding to a velocity profile of the EV 102 (e.g., the velocity profile 302) and a graphical plot 504 corresponding to a total torque profile of the EV 102 (e.g., the total torque profile 306), according to some embodiments of the present disclosure.

As described in FIG. 3, the total torque profile 306 may be determined from the velocity profile 302 using the longitudinal motion model 304. Such total torque profile 306 is depicted in the graphical plot 504.

There may be different torque demands by the multiple electric motors of the EV 102 when the EV 102 is driving on the road 404. For instance, the torque demand may be high when the EV 102 drives to move ahead of the vehicle 402. The torque demand may be low when the EV 102 slows down to take a turn. In some cases, the torque demand may be at peak when the EV 102 drives on an uphill road. In order to control the multiple electric motors of the EV 102, the total torque profile 306 may allocated among the multiple electric motors using a torque-split function. The multiple electric motors may correspond to two electric motors, such as the first electric motor 316A and the second electric motor 316B.

For the multiple electric motors of the EV 102, the total torque profile 306 is allocated using the predetermined torque-split function 308 and the velocity profile 302 in order to compute torque for corresponding wheels connected to the multiple electric motors $\tau_{i,k}^{wheel}$. The torque for the corresponding wheels may be computed as, $$\tau_{1,k}^{wheel}, \ldots, \tau_{n,k}^{wheel} = F_{TS}(T_k, v_k^\star) \quad (17)$$

Figure 5B:
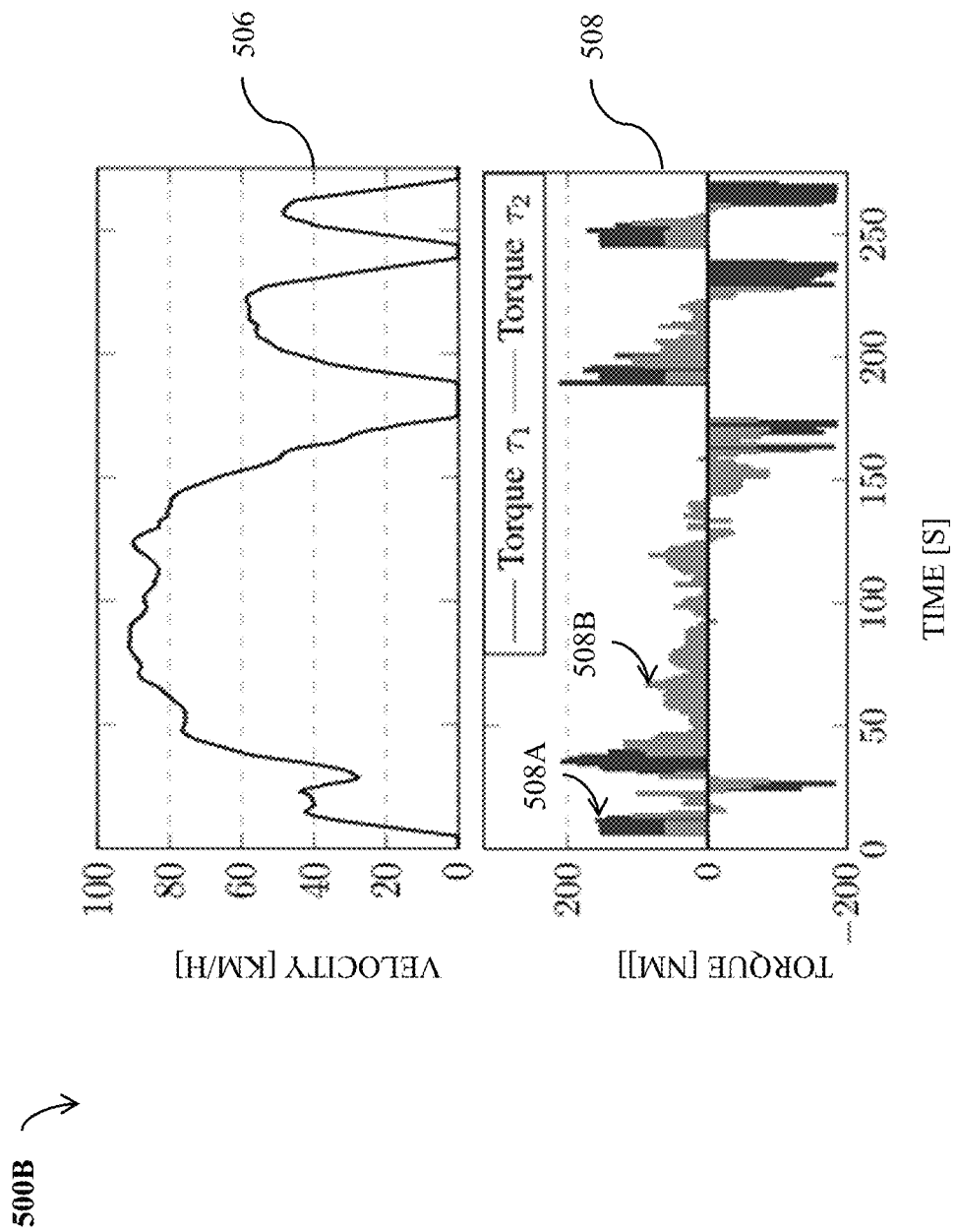
FIG. 5B shows an exemplary graphical representation depicting splitting of a total torque profile of the EV, according to some embodiments of the present disclosure.
Figure 5C:
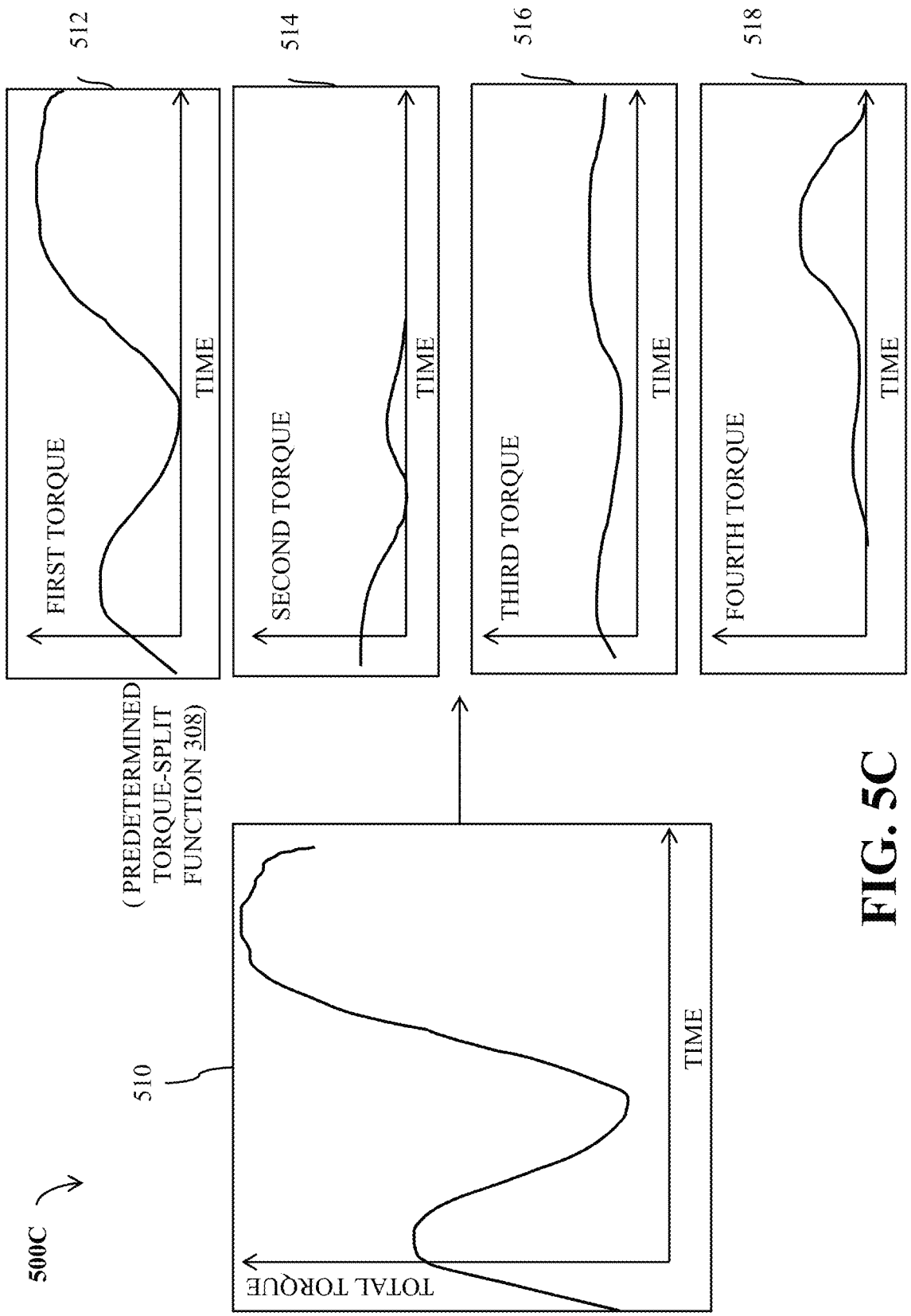
FIG. 5C shows an exemplary representation depicting splitting of the total torque profile of the EV, according to some other embodiments of the present disclosure.

The allocation of the total torque profile 306 among the multiple electric motors is shown in FIGS. 5B and 5C.

FIG. 5B shows an exemplary graphical representation 500B depicting splitting of the total torque profile 305, according to some embodiments of the present disclosure. The graphical representation 500B includes a graphical plot 506 and a graphical plot 508. The graphical plot 506 corresponds to a speed trajectory of the EV 102 when the total torque profile 306 is split between two electric motors of the EV 102, such as the first electric motor 316A and the second electric motor 316B. The graphical plot 508 corresponds to splitting the torque profile 306 into a first torque profile 508A ($\tau 1$) for the first electric motor 316A and a second torque profile 508B ($\tau 2$) for the second electric motor 316B. For instance, the first torque profile 508A includes a maximum power 150 kW and the second torque profile 508B includes maximum power 50 kW, as shown in FIG. 5A.

The first electric motor 316A is controlled according to the first torque profile 508A and the second electric motor 316B is controlled according to the second torque profile 508B. Each of the first electric motor 316A and the second electric motor 316B may be used for different torque demands. For instance, the first electric motor 316A may be used for high-torque demand when the EV 102 drives to move ahead of the vehicle 402. The second electric motor 316B may be used for low torque demand when the EV 102 slows down to take a turn at the road 404. In some cases, both the first electric motor 316A and the second electric motor 316B may be used for peak torque demand when the EV 102 drives on an uphill road.

In some cases, the multiple electric motors may correspond to four electric motors of the EV 102. The total torque profile 306 is allocated among the four electric motors of the EV 102, which is shown in FIG. 5C.

FIG. 5C shows an exemplary graphical representation 500C depicting splitting of the total torque profile 306, according to some other embodiments of the present disclosure. The graphical representation 500C includes a graphical plot 510 corresponding to the total torque profile 306. The total torque profile 306 is allocated among four electric motors of the EV 102 using the predetermined torque-split function 308. As shown in FIG. 5C, the total torque profile 306 is split into a first torque profile for a first electric motor depicted in a graphical plot 512, a second torque profile for a second torque electric motor depicted in a graphical plot 514, a third torque profile for a third electric motor depicted in a graphical plot 516 and a fourth torque profile for a fourth electric motor depicted in a graphical plot 518.

Further, the torque profile and the velocity profile are used for computing the gear ratio for transmission of the one or multiple electric motors. The computed gear ratio is represented in a graphical plot, which is shown in FIG. 5D.

Figure 5D:
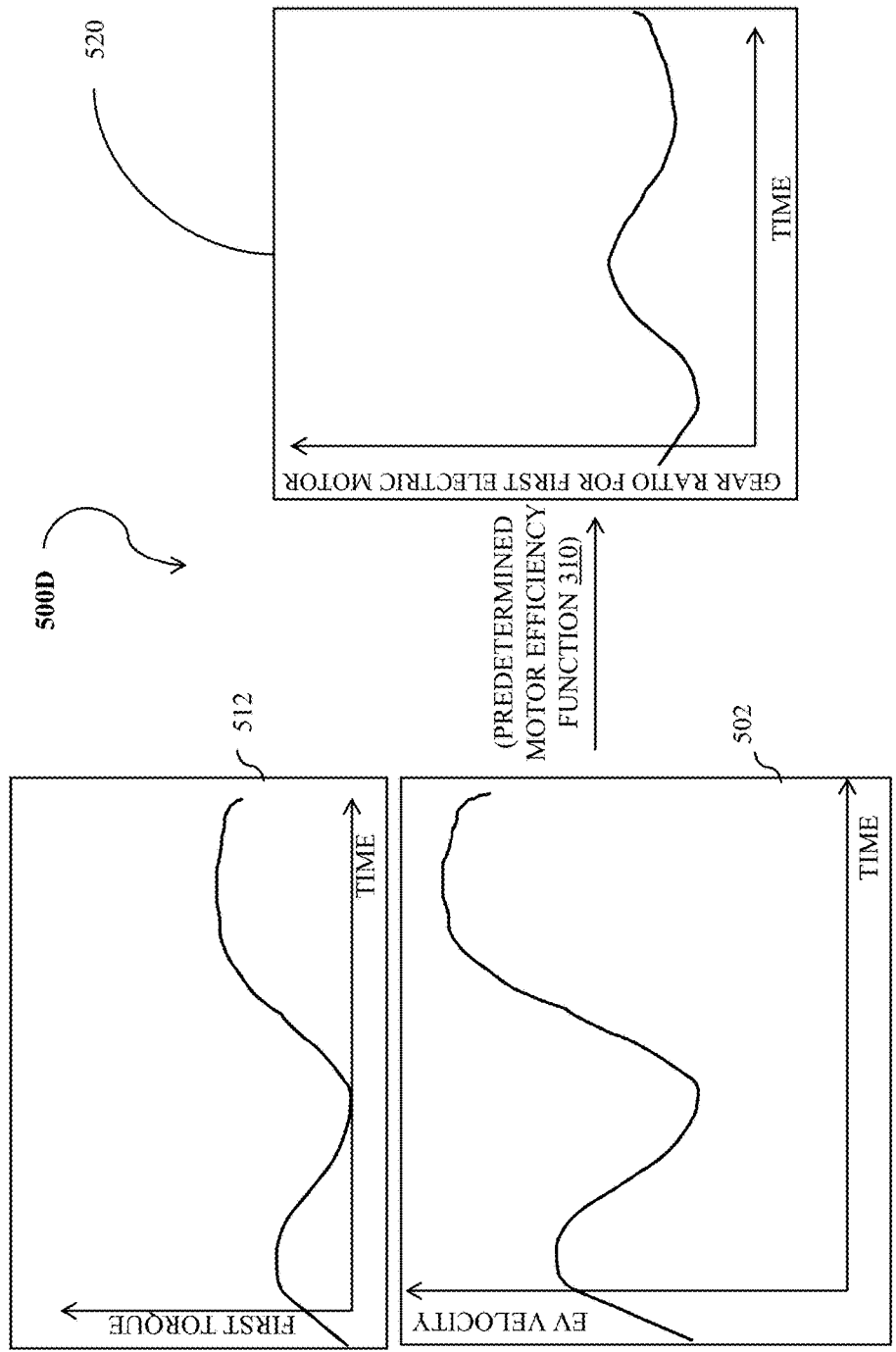
FIG. 5D shows an exemplary graphical representation depicting a gear ratio for transmission of one or multiple electric motors of the EV, according to some embodiments of the present disclosure.

FIG. 5D shows an exemplary graphical representation 500D depicting a gear ratio (e.g., the gear ration 312) for transmission of the one or multiple electric motors of the EV 102, according to some embodiments of the present disclosure. The graphical representation 500D includes a graphical plot 520 corresponding to the gear ratio 312 that is computed from the first torque profile depicted in the graphical plot 512 and the velocity profile 302 depicted in the graphical plot 502 using the predetermined motor efficiency function 310.

In an example scenario, the four electric motors of the EV 102 may include a first electric motor of the EV 102 that may be a powerful electric motor, and a second electric motor of the EV 102 that may be a weak electric motor. The difference in power of the electric motors may affect energy consumption. When the first electric motor and the second electric motor are accelerated, energy consumption may be high. In such scenario, the acceleration of the electric motors is modulated based on the velocity profile 302. The modulation of the acceleration saves energy, which is shown in a graphical representation of FIG. 5E.

Figure 5E:
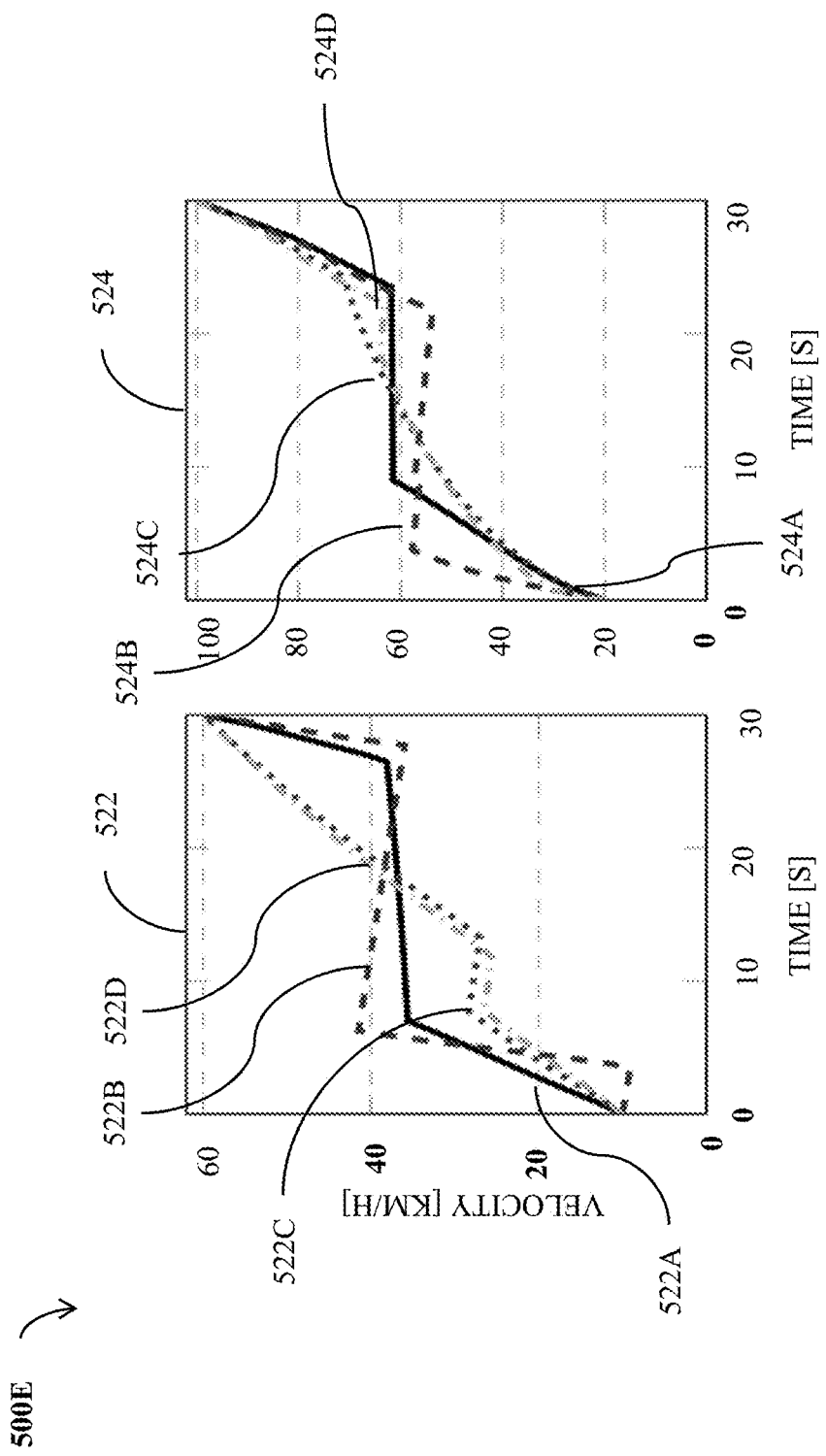
FIG. 5E shows an exemplary graphical representation depicting a velocity profile for the EV, according to some embodiments of the present disclosure.

FIG. 5E shows an exemplary graphical representation 500E depicting the velocity profile 302 for the EV 102, according to some embodiments of the present disclosure. The graphical representation 500E includes a graphical plot 522 and a graphical plot 524 that describe an energy-optimal velocity profile for minimizing energy consumption by the one or multiple electric motors of the EV 102. The graphical plot 522 includes a curve 522A corresponding to velocity profile of the EV 102 with no transmission for one or multiple electric motors of the EV 102, a curve 522B corresponding to velocity profile when the EV 102 uses one electric motor, such as the first electric motor 316A of the EV 102 with a transmission such as continuously variable transmission (CVT), a curve 522C corresponding to velocity profile when the EV 102 uses the second electric motor 316B with the CVT transmission, and a curve 522D corresponding to velocity profile when the EV 102 uses both the first electric motor 316A and the second electric motor 316B of the EV 102 with the CVT transmission, for changing gear of the EV 102. In a similar manner, the graphical plot 524 includes a curve 524A, a curve 524B, a curve 524C and a curve 524D that describe different velocity profile of the EV 102 with different configurations mentioned above. As shown in FIG. 5E, the energy-optimal velocity profile depends on configuration of the EV 102, such as use of electric motor with transmission, use of the multiple electric motors in the EV 102 with or without transmission, or the like.

In one example scenario, the first electric motor 316A may correspond to a powerful electric motor of the EV 102 and the second electric motor 316B may correspond to a weak electric motor of the EV 102. In some cases, the EV 102 may not use the CVT for changing gear of the EV 102. In such cases, the first electric motor 316A may be accelerated first, as shown in the graphical plot 522 (e.g., the curve 522A at 0-8 s in time-axis) and the graphical plot 524 (e.g., the curve 524A at 0-9 s in time-axis). Next, the acceleration may switch to the second electric motor 316B, as shown in the graphical plot 522 (e.g., the curve 522A at 8-26 s in time-axis) and the graphical plot 524 (e.g., the curve 524A at 9-22 s in time-axis). Further, the acceleration may switch back to the first electric motor 316A, as shown in the graphical plot 522 (e.g., the curve 522A at 26-30 s in time-axis) and the graphical plot 524 (e.g., the curve 524A at 22-30 s in time-axis).

Using the velocity profile 302, the EV 102 can save energy, such as energy savings between 1.5-13%. For instance, the EV 102 accelerates from initial velocities 10 km/h and 20 km/h to reach target velocities, such as 60 km/h and 100 km/h, respectively, within the period of time, such as 30 seconds. The average velocity of the velocity profile 302 may be constrained such that distance traveled over the period of time allocated for the velocity profile 302 is the same.

Figure 6:
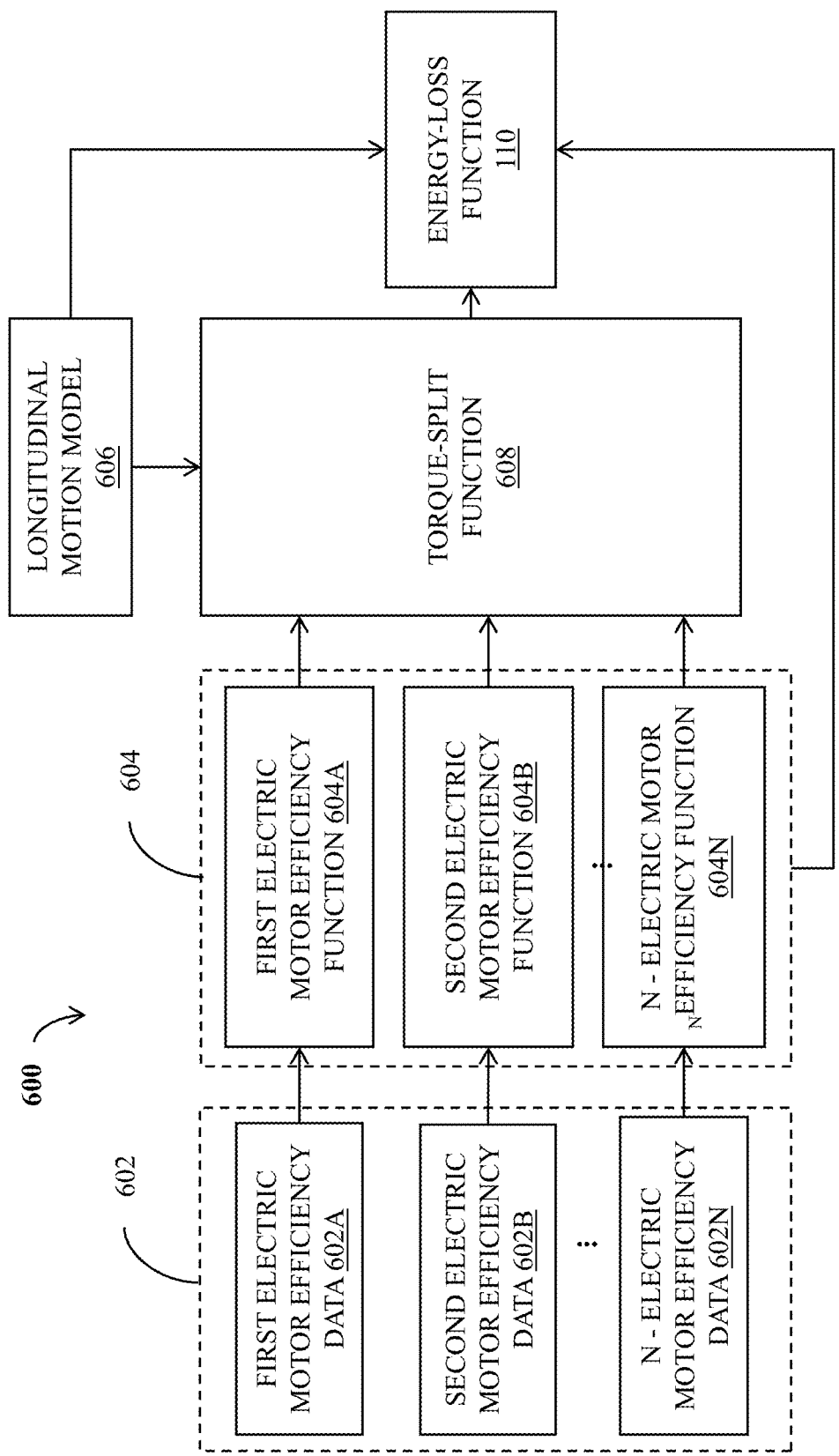
FIG. 6 illustrates a schematic block diagram corresponding to a procedure for learning an energy-loss function for controlling a motion of the EV, according to some embodiments of the present disclosure.

The derivation of the energy-loss function 110 for the multiple electric motors of the EV 102 is described further with reference to FIG. 6.

FIG. 6 illustrates a schematic block diagram 600 corresponding to a procedure for learning the energy-loss function 110 for controlling the motion of the EV 102, according to some embodiments of the present disclosure.

In some embodiments, the energy-loss function 110 may be learned using a kernel-based regression. The kernel-based regression fits data of one or multiple electric motor efficiencies 602 of the one or multiple electric motors to the energy-loss function 110 based on a model of drivetrain losses of the one or multiple electric motors and a model of driving losses caused by aerodynamic and rolling resistance of the EV 102. The model of drivetrain losses may be determined from the one or multiple efficiencies resulting from using energy and regeneration of the energy from the acceleration and deceleration of the EV 102.

In some example embodiments, the one or multiple electric motor efficiencies 602 may be obtained from corresponding electric motor efficiency data of the one or multiple electric motors of the EV 102. For instance, the one or multiple electric motor efficiencies 602 may be obtained from a first electric motor efficiency data 602A, a second electric motor efficiency data 602B, and an $N^{th}$ electric motor efficiency data 602N of the one or multiple electric motors of the EV 102.

Each of the first electric motor efficiency data 602A, the second electric motor efficiency data 602B, and the $N^{th}$ electric motor efficiency data 602N may be used to determine a motor efficiency function 604 of the corresponding one or multiple electric motors. The motor efficiency function 604 is an example of the predetermined motor efficiency function 310. For instance, the first electric motor efficiency data 602A is used for determining a first electric motor efficiency function 604A for the first electric motor of the EV 102, the second electric motor efficiency data 602B is used for determining a second electric motor efficiency function 604B for the second electric motor of the EV 102, and the $N^{th}$ electric motor efficiency data 602N is used for determining an $N^{th}$ electric motor efficiency function 604N for $N^{th}$ electric motor of the EV 102.

Further, the motor efficiency functions 604 of the one or multiple electric motors of the EV 102 may be used with a longitudinal motion model 606 of the EV 102 to determine a torque-split function 608. The longitudinal motion model 606 corresponds to the longitudinal motion model 304 and the torque-split function 608 corresponds to the predetermined torque-split function 310. In some embodiments, all of the motor efficiency functions 604, the longitudinal motion model 606 and the torque-split function 608 may be used for determining the energy-loss function 110.

In some example embodiments, the kernel regression learns a model corresponding to the motor efficiency functions 604, the longitudinal motion model 606 and the torque-split function 608 and the energy-loss function 110. The kernel regression is described further with reference to FIG. 7.

Figure 7:
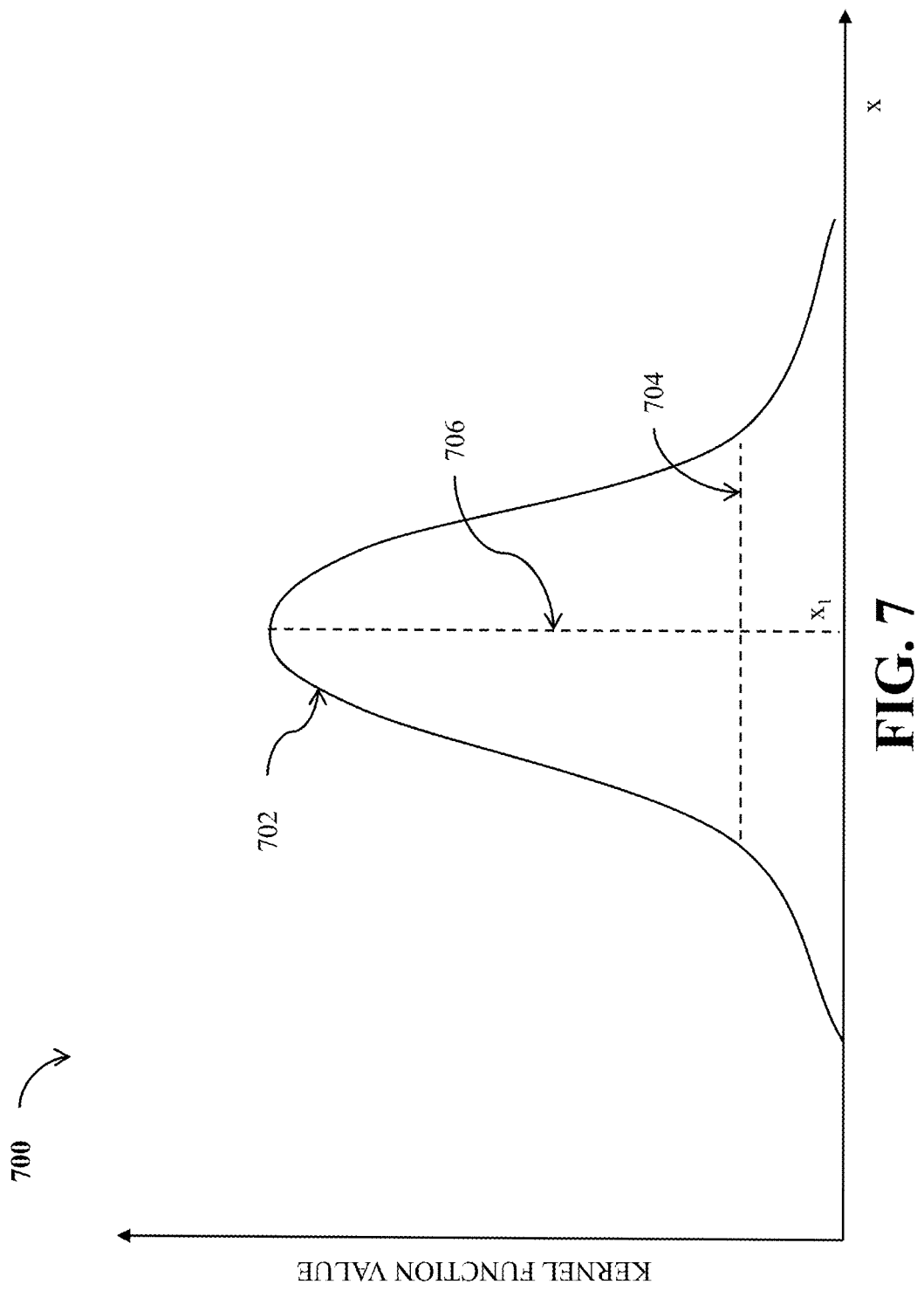
FIG. 7 shows an exemplary graphical representation depicting a graphical plot corresponding to a kernel function of a kernel regression for learning a model of the energy-loss function, according to some embodiments of the present disclosure.

FIG. 7 shows an exemplary graphical representation depicting a graphical plot 700 corresponding to a kernel function 702 of a kernel regression for learning a model of the energy-loss function 110, according to some embodiments of the present disclosure. The kernel regression is a data-based model fitting method that uses the kernel function 702. The kernel function 702 may use a set of training data (X) corresponding to the one of the one or multiple electric motor efficiencies 602 of FIG. 6 for learning a continuous function from the set of training data. The training data may be obtained using a grid of data for a velocity of the EV 102 and an acceleration of the EV 102, which is further described in FIG. 9.

In particular, the kernel function 702 relates two data points in the training dataset (X) for determining the energy-loss function 110.

The training dataset (X) may be represented as, $$X = [x_1\ x_2\ \ldots\ x_N] \in R^{n_x \times N} \quad (18a);$$

$$y = [y_1\ y_2\ \ldots\ y_N] \in R^{1 \times N} \quad (18b)$$

The kernel function 702 determines $y_i = L(x_i)$ for all $i = 1, \ldots, N$ training data points. Further, using $y = L(x) = k(x, X)\alpha + \alpha_0$ with the kernel function 702 $k(x, X) = [k(x, x_1)\ k(x, x_2)\ \ldots\ k(x, x_N)]$ (18), where $\alpha$ and $\alpha_0$ are weights to be learned using the training data. The kernel function 702 may be reformulated as, $$K(X, X) = \begin{bmatrix} k(x_1, X) \\ k(x_2, X) \\ \vdots \\ k(x_N, X) \end{bmatrix}.$$

The weights α and α₀ are learnt using the following optimization problem, $$\min_{\alpha_0, \alpha \in R^{n_x}} \|(\sigma^2 I + K(X, X))\alpha + 1\alpha_0 - y^T\|_2^2 \quad (19a)$$

$$\text{s.t.} \quad \langle \nabla_x k(x, X)\alpha, x - x^* \rangle \geq = 0 \forall x \in \aleph \quad (19b)$$

where, $1=[1\ 1\ \ldots\ 1]^T \in R^N$, $\langle .,. \rangle$ denotes an inner product, I is an identity matrix, and σ denotes noise in the training data.

More specifically, the kernel-based function 702 may be used as a pseudo-convex loss function having a global minimum. i.e., a smallest overall value in the data of the one or multiple efficiencies 602. To that end, equation (19b) may be used for determining the global optimum (x*), based on the pseudo-convex loss function for all x belonging to X, where the set X may include operating range of the one or multiple electric motors of the EV 102. For example, the motor efficiency function 604 (η) may be a function of a motor speed (ω) and a motor torque (τ). The motor efficiency function 604 may be defined as $\eta = k([\omega, \tau]^T, X)\alpha + \alpha_0$.

The kernel function 702 enables a flexible approximation capability for representing the model of the drivetrain losses and the model of the driving losses of the EV 102 in an accurate manner. To that end, the kernel function 702 may use a radial basis function, which is a real-valued function, may be represented as, $$k_{x,x}(x, x_1) = v^2 \exp\left(-\frac{1}{2l^2}\|x - x_1\|_2^2\right), \quad (20)$$

where l is a length scale that determines a width 704 of the kernel function 702 and $x_1$ is a kernel point on the kernel function 702, and $v^2$ is an output variance determining a height 706 of the kernel function 702. The kernel function 702 may be useful for a gradient-based optimization as training data points, X, that are distant from x may have little impact on the gradient.

The motor efficiency function 604 for an electric motor i of the EV 102 may be represented by $$\eta_i(\omega_{i,k}, \tau_{i,k}) = K_{x,X_\eta}\left(\begin{bmatrix}\omega_{i,k} \\ \tau_{i,k}\end{bmatrix}, X_{i,\eta}\right)\alpha_\eta, \quad (21)$$

where $\omega_{i,k}$ is the motor speed of the electric motor i at time k, $\tau_{i,k}$ is the motor torque of electric motor i at time k, $\alpha_\eta$ are efficiency parameters for the motor efficiency function 604 that may be learned using the kernel regression, $K_{x,X_\eta}$ is a vector kernel function 702 with $$K_{x,X\eta}(x_{i,k}, X_{i,\eta}) = [k_{x,x}(x_{i,k}, x_i^1)\ k_{x,x}(x_{i,k}, x_1^2)\ \ldots\ k_{x,x}(x_{i,k}, x_i^{n_i})], \quad (22)$$

where $x_{i,k} = [\omega_{i,k}\ \tau_{i,k}]^T$ is a vector comprising the motor speed $\omega_{i,k}$ and the motor torque $\tau_{i,k}$ of electric motor i, and $x_i^j$ for all $j=1, \ldots, n_i$ are the training data with $x_i^j = [\omega_i^j\ \tau_i^j]^T$.

The kernel regression may be used to obtain the efficiency parameters $\alpha_\eta$ with $$\alpha_\eta = \underset{\tilde{\alpha}_\eta}{\operatorname{argmin}} \left\| \begin{bmatrix} \eta_i^1 \\ \eta_i^2 \\ \vdots \\ \eta_i^{n_\eta} \end{bmatrix} - (K_{X_\eta, X_\eta}(X_{i,\eta}, X_{i,\eta}) + \sigma^2 I)\tilde{\alpha}_\eta \right\|_2 \quad (23)$$

where $K_{X_\eta, X_\eta}(X_\eta, X_\eta)$ is a matrix comprising a training data corresponding to the efficiency data of the electric motor i with $$K_{X_\eta, X_\eta}(X_{i,\eta}, X_{i,\eta}) = \begin{bmatrix} K_{x,X_\eta}(x_i^1, X_{i,\eta}) \\ K_{x,X_\eta}(x_i^2, X_{i,\eta}) \\ \vdots \\ K_{x,X_\eta}(x_i^{n_i}, X_{i,\eta}) \end{bmatrix} \quad (24)$$

and $\eta_i^j$ are the one or multiple efficiencies 602 associated with the motor speed $\omega_i^j$ and the motor torque $\tau_i^j$.

Further, the kernel regression in (23) may use a constraint to obtain the motor efficiency function 604 of a first electric motor (e.g., the first electric motor 314) $\eta_i(\omega_{i,k}, \tau_{i,k})$ in (20) pseudo convex.

For example, the efficiency parameters may be obtained as $$\alpha_\eta = \underset{\tilde{\alpha}_\eta}{\operatorname{argmin}} \left\| \begin{bmatrix} \eta_i^1 \\ \eta_i^2 \\ \vdots \\ \eta_i^{n_\eta} \end{bmatrix} - (K_{X_\eta, X_\eta}(X_{i,\eta}, X_{i,\eta}) + \sigma^2 I)\tilde{\alpha}_\eta \right\|_2^2 \quad (25)$$

$$\text{s.t.} \quad \langle \nabla_x K_{x,X_\eta}\left(\begin{bmatrix}\omega \\ \tau\end{bmatrix}, X_{i,\eta}\right)\tilde{\alpha}_\eta,$$

$$\begin{bmatrix}\omega \\ \tau\end{bmatrix} - \begin{bmatrix}\omega_i^* \\ \tau_i^*\end{bmatrix} \rangle \leq 0 \forall \begin{bmatrix}\omega \\ \tau\end{bmatrix} \in X_{dom}$$

where $[\omega_i^*\ \tau_{i*}]^T$ denotes a point of global optimality, $\nabla_x$ denotes a gradient with respect to x, $X_{dom}$ denotes a domain for which the constraint has to be satisfied, and $\langle x_1, x_2 \rangle = x_1^T x_2$ denotes an inner product of a first input $x_1$ and a second input $x_2$.

Figure 8:
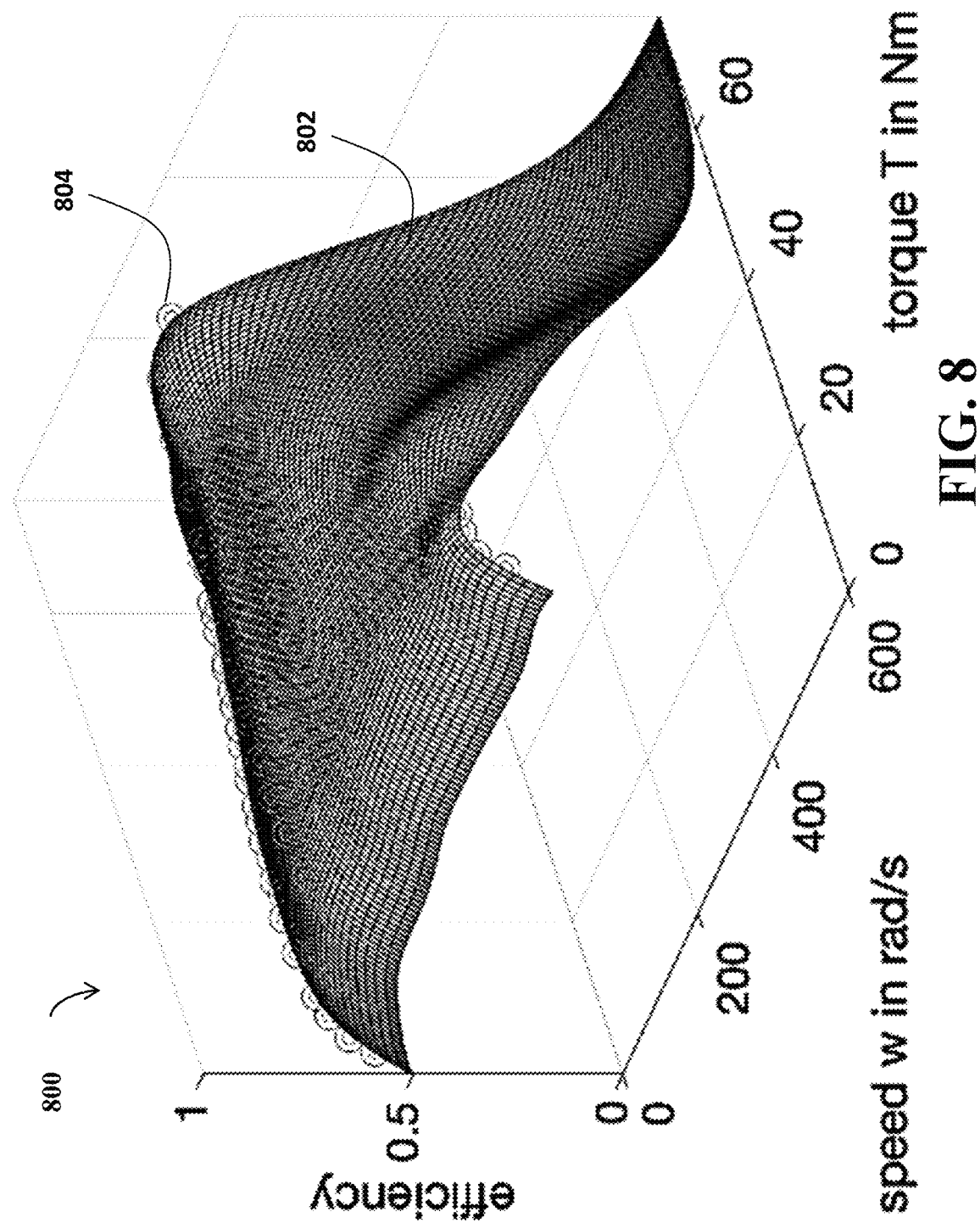
FIG. 8 shows an exemplary graphical representation depicting a predetermined motor efficiency function, according to some embodiments of the present disclosure.

The kernel regression in (25) may be used for learning the motor efficiency function 604 (described in FIG. 6) from a training data set, which is described further with reference to FIG. 8.

FIG. 8 shows a graphical representation 800 depicting a predetermined motor efficiency function 802, according to some embodiments of the present disclosure. The predetermined motor efficiency function 802 is an example of the motor efficiency function 604 that may be learned from a training data set $X_{i,\eta}$ 804 using the kernel regression method. The kernel regression uses the constraint in equation (23) to obtain a pseudo convex function for the predetermined motor efficiency function 802, as shown in FIG. 8. Further, the predetermined motor efficiency function 802 is used along with the longitudinal motion model 606 to determine a torque-split function, such as the torque-split function 608. In some example embodiments, the torque-split function 608 may correspond to an interpolation function. The interpolation function is described further with reference to FIG. 9.

Figure 9:
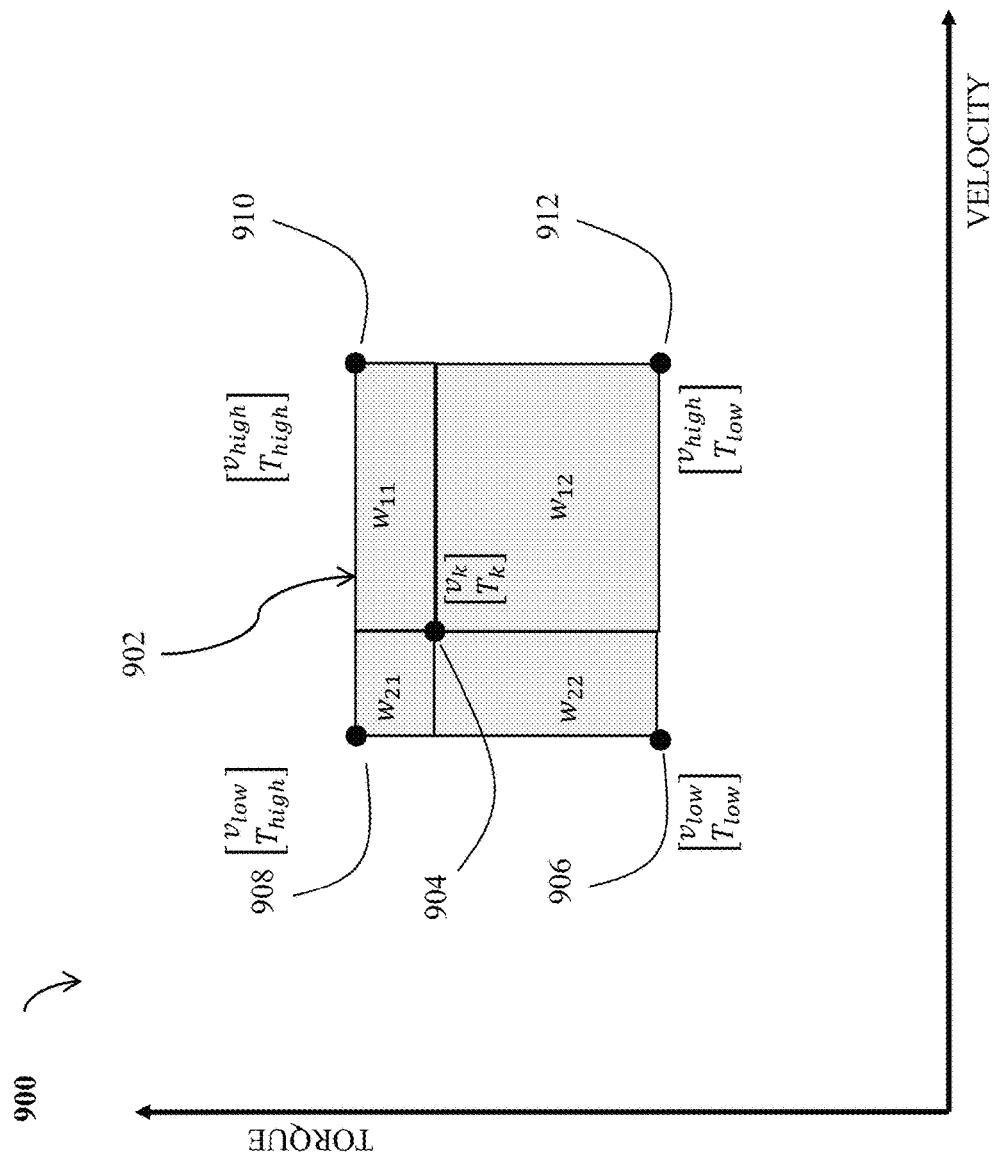
FIG. 9 shows an exemplary graphical representation depicting an interpolation function corresponding to a torque-split function, according to some embodiments of the present disclosure.

FIG. 9 shows an exemplary graphical representation depicting an interpolation function 900 corresponding to the torque-split function 608, according to some embodiments of the present disclosure. The interpolation function 900 may use a grid 902 of sample data for a velocity of the EV 102 and a total torque of the EV 102. For each sample grid point in the grid 902, an optimal torque-split ratio is determined using the predetermined motor efficiency function 802 of all the electric motors of the EV 102 and/or optimal transmission gear ratios for any or all transmissions of the electric motors of the EV 102. The optimal torque-split ratio for all sample grid points in the grid 902 may be stored in a memory, such as the memory 108 the system 100. The torque-split function may use the stored grid 902 of the velocity and the total torque of the EV 102 with the corresponding torque-split ratio of the electric motors of the EV 102.

For a specific velocity and a total torque ($[v_k \ T_k]^T$) 904 of the EV 102, the torque-split function 608 may determine four closest torque grid points $[v_{low} \ T_{low}]^T$ 906, $[v_{low} \ T_{high}]^T$ 908, $[v_{high} \ T_{high}]^T$ 910 and $[v_{high} \ T_{low}]^T$ 912 in the grid 902, as shown in FIG. 9. The closest torque grid points $[v_{low} \ T_{low}]^T$ 906, $[v_{low} \ T_{high}]^T$ 908, $[v_{high} \ T_{high}]^T$ 910 and $[v_{high} \ T_{low}]^T$ 912 are used for determining an optimal torque-split ratio for the specific velocity and total torque ($[v_k \ T_k]^T$) 904. The optimal torque-split ratio for the specific velocity and total torque ($[v_k \ T_k]^T$) 904 may be computed as, $$F_{TS}(T_k, v_k) = w_{11}F_{11} + w_{12}F_{12} + w_{22}F_{22} + w_{21}F_{21}, \quad (26)$$

where $F_{11} = F_{TS}(T_{low}, v_{low})$ denotes a predetermined optimal torque-split ratio corresponding to grid point $[v_{low} \ T_{low}]^T$ 906 of the grid 902, $F_{21} = F_{TS}(T_{low}, v_{high})$ denotes a predetermined optimal torque-split ratio corresponding to grid point $[v_{low} \ T_{high}]^T$ 908 of the grid 902, $F_{22} = F_{TS}(T_{high}, v_{high})$ denotes a predetermined optimal torque-split ratio corresponding to grid point $[v_{high} \ T_{high}]^T$ 910 of the grid 902, and $F_{12} = F_{TS}(T_{high}, v_{low})$ denotes a predetermined optimal torque-split ratio corresponding to grid point $[v_{high} \ T_{low}]^T$ 912 of the grid 902. $F_{11}$, $F_{21}$, $F_{22}$ and $F_{12}$ together represent a set of predetermined optimal torque-split ratios. Further, $$w_{11} = \frac{(T_{high} - T_k)(v_{high} - v_k)}{(T_{high} - T_{low})(v_{high} - v_{low})} \quad (27)$$

$$w_{12} = \frac{(T_k - T_{low})(v_{high} - v_k)}{(T_{high} - T_{low})(v_{high} - v_{low})},$$

$$w_{21} = \frac{(T_{high} - T_k)(v_k - v_{low})}{(T_{high} - T_{low})(v_{high} - v_{low})}$$

$$w_{22} = \frac{(T_k - T_{low})(v_k - v_{low})}{(T_{high} - T_{low})(v_{high} - v_{low})}$$

For each grid point $[v_i \ a_i]$ in the grid 902, where i denotes the i-th grid point, the energy-loss is evaluated. The energy-loss may be evaluated using the energy-loss function 110 that include driving losses $L_{drive}(v_i)$ resulting from aerodynamic drag and rolling resistance as $$L_{drive}(v_i) = v_i(F_{drag}(v_i) + F_{roll}(v_i)) \quad (28)$$

The energy-loss function 110 may also include motor losses $L_{motor}(v_i, \alpha_i)$ resulting from efficiencies of electric motors of the EV 102 (e.g., the one or multiple electric motor efficiencies 602) as, $$L_{motor}(v_i, a_i) = \sum_{j=1}^{n} \tau_{j,i}^{wheel} \frac{v_i}{r_{wheel}} \cdot \begin{cases} (1/\eta_j - 1)\tau_{j,i}^{wheel} \geq 0 \\ \eta_j - 1 \text{ else} \end{cases} \quad (29)$$

where wheel torques $\tau_{j,i}^{wheel}$ of the EV 102 are obtained using a torque-split function (e.g., the predetermined torque-split function 308 that computes torque for the corresponding wheels of the EV 102 using equation (16)) with a total torque $T_k$ computed in (15), and motor efficiencies $\eta_j$ are obtained using (17)

$$q_{i,k}^* = \operatorname*{argmax}_{\tilde{q}} \eta_i\left(\tilde{q}\frac{v_k^*}{r_{wheel}}, \frac{1}{\tilde{q}}\tau_{i,k}^{wheel}\right) \forall \ i = 1, \ldots, m, \quad (30)$$

for the specific grid point with $$\eta_i = \max_{\tilde{q}} \eta_i\left(\tilde{q}\frac{v_i}{r_{wheel}}, \frac{1}{\tilde{q}}\tau_{j,i}^{wheel}\right) \quad (31)$$

In this manner, the energy-loss function 110 may use knowledge of the predetermined torque-split function 308 and the predetermined motor efficiency function 310. The training data for the energy-loss function 110 of the EV 102 may be represented as, $$L_{EV,i} = L_{drive}(v_i) + L_{motor}(v_i, a_i) \quad (32)$$

The energy-loss function 110 that is learned using the kernel regression may be computed by, $$L_{EV}(v, a) = K_{x,X_L}\left(\begin{bmatrix} v \\ a \end{bmatrix}, X_L\right)\alpha_L + \alpha_0, \quad (33)$$

where $\alpha_L$ and $\alpha_0$ are the parameters to be learned, $K_{x,X_L}$ is a vector kernel function with $$K_{x,X_L}(x_L, X_L) = [k_{x,x}(x_L, x_L^1) \ k_{x,x}(x_L, x_L^2) \ldots k_{x,x}(x_L, x_L^{n_L})] \quad (34)$$

where $x_L = [v \ a]^T$ and $x_L^i$ are vectors comprising the training data with $i = 1, \ldots, n_L$ with $x_L^i = [v_i \ a_i]^T$. Further, some embodiments use kernel regression in order to obtain the energy-loss parameters $\alpha_L$ and $\alpha_0$ with $$\alpha_L, \alpha_0 = \quad (35)$$

$$\operatorname*{argmin}_{\tilde{\alpha}_L, \tilde{\alpha}_0} \left\| \begin{bmatrix} L_{EV,1} \\ L_{EV,2} \\ \vdots \\ L_{EV,n_L} \end{bmatrix} - \left( (K_{X_L, X_L}(X_L, X_L) + \sigma_L^2 I)\tilde{\alpha}_L + \begin{bmatrix} 1 \\ 1 \\ \vdots \\ 1 \end{bmatrix} \tilde{\alpha}_0 \right) \right\|_2^2$$

where $K_{X_L, X_L}(X_L, X_L)$ is a matrix comprising the training data of the energy-loss function 110 with $$K_{X_L, X_L}(X_L, X_L) = \begin{bmatrix} K_{x, X_L}(x_L^1, X_L) \\ K_{x, X_L}(x_L^2, X_L) \\ \vdots \\ K_{x, X_L}(x_L^{n_i}, X_L) \end{bmatrix} \quad (36)$$

and $L_{EV,i}$ are the energy-loss values associated with an operating point of the EV 102, $x_L^i = [v_i \ a_i]^T$.

Further, the kernel regression in (34) may use a constraint to obtain a pseudo convex shape of the energy-loss function 110 in (32). To that end, parameters for the energy-loss function 110 may be obtained as $$\alpha_L, \alpha_0 = \quad (37)$$

$$\underset{\alpha_L, \alpha_0}{\operatorname{argmin}} \left\| \begin{bmatrix} L_{EV,1} \\ L_{EV,2} \\ \vdots \\ L_{EV,n_L} \end{bmatrix} - \left( (K_{X_L, X_L}(X_L, X_L) + \sigma_L^2 I) \tilde{\alpha}_L + \begin{bmatrix} 1 \\ 1 \\ \vdots \\ 1 \end{bmatrix} \tilde{\alpha}_0 \right) \right\|_2^2$$

$$\text{s.t.} \ < \nabla_x K_{x,X_L}(x_L, X_L) \tilde{\alpha}_\eta, x_L > \ \geq \ 0 \forall \ x_L \in X_{L,dom}$$

where $X_{L,dom}$ denotes a domain for which the constraint has to be satisfied.

Figure 10:
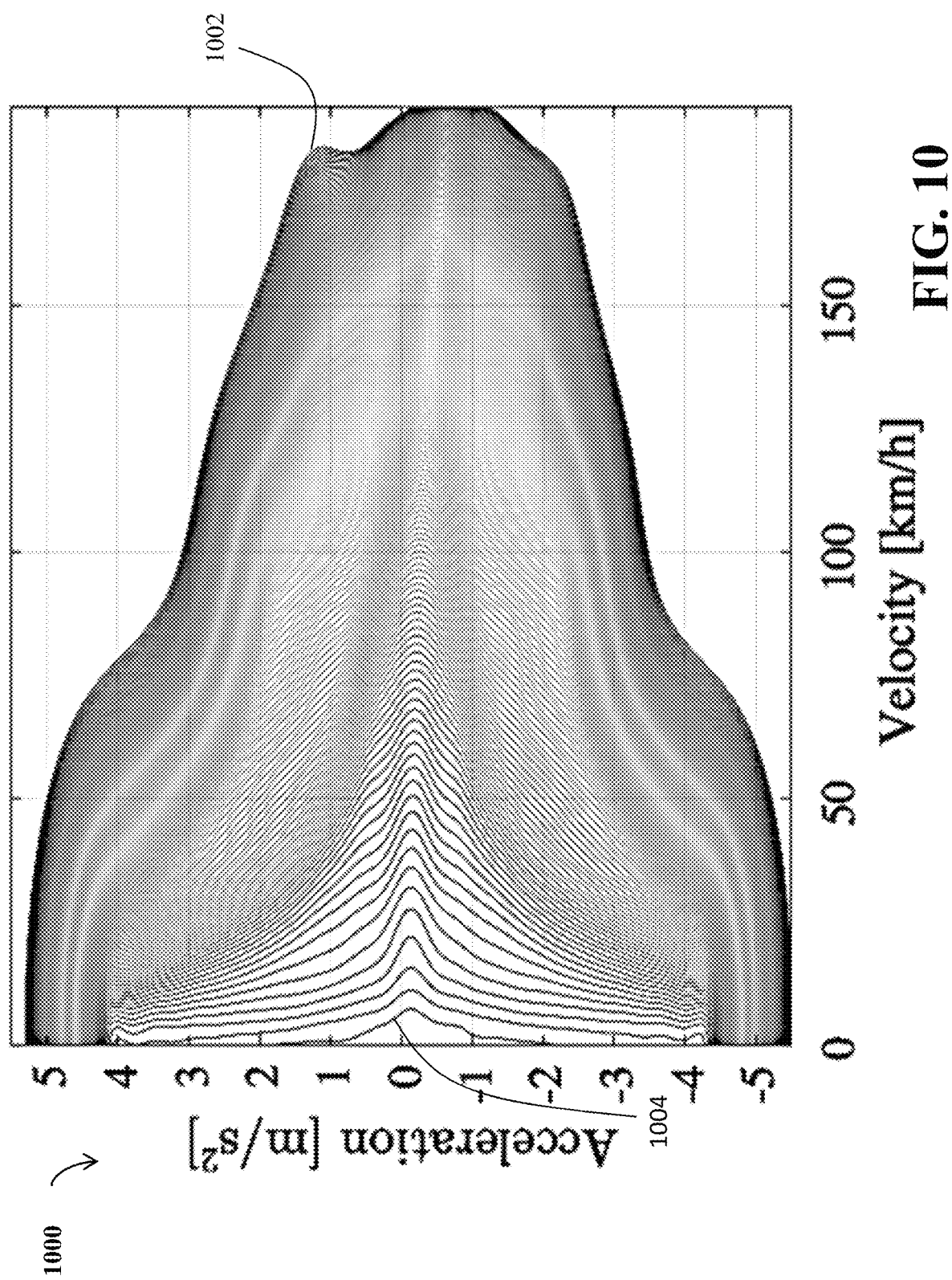
FIG. 10 shows an exemplary graphical representation depicting an energy-loss function, according to some embodiments of the present disclosure.

An exemplary graphical representation of the energy-loss function 110 is described further with reference to FIG. 10.

FIG. 10 shows an exemplary graphical representation 1000 depicting an energy-loss function 1002, according to some embodiments of the present disclosure. The energy-loss function 1002 is an example of the energy-loss function 110. The energy-loss function 1002 is represented as function of the velocity and the acceleration of the EV 102 as driving losses of the EV 102 such as the aerodynamic drag and the rolling resistance depend on the velocity and motor losses resulting from motor efficiencies (e.g., the one or multiple motor efficiencies 602) depend on the velocity of the EV 102 and on the motor torques, which are linked to the acceleration of the EV 102.

As shown in FIG. 10, the graphical representation 1000 includes energy-loss lines separated by 300 Watts. For example, an energy-loss line 1004 in the graphical representation 1000 indicates, an energy-loss of 300 Watts.

Figure 11:
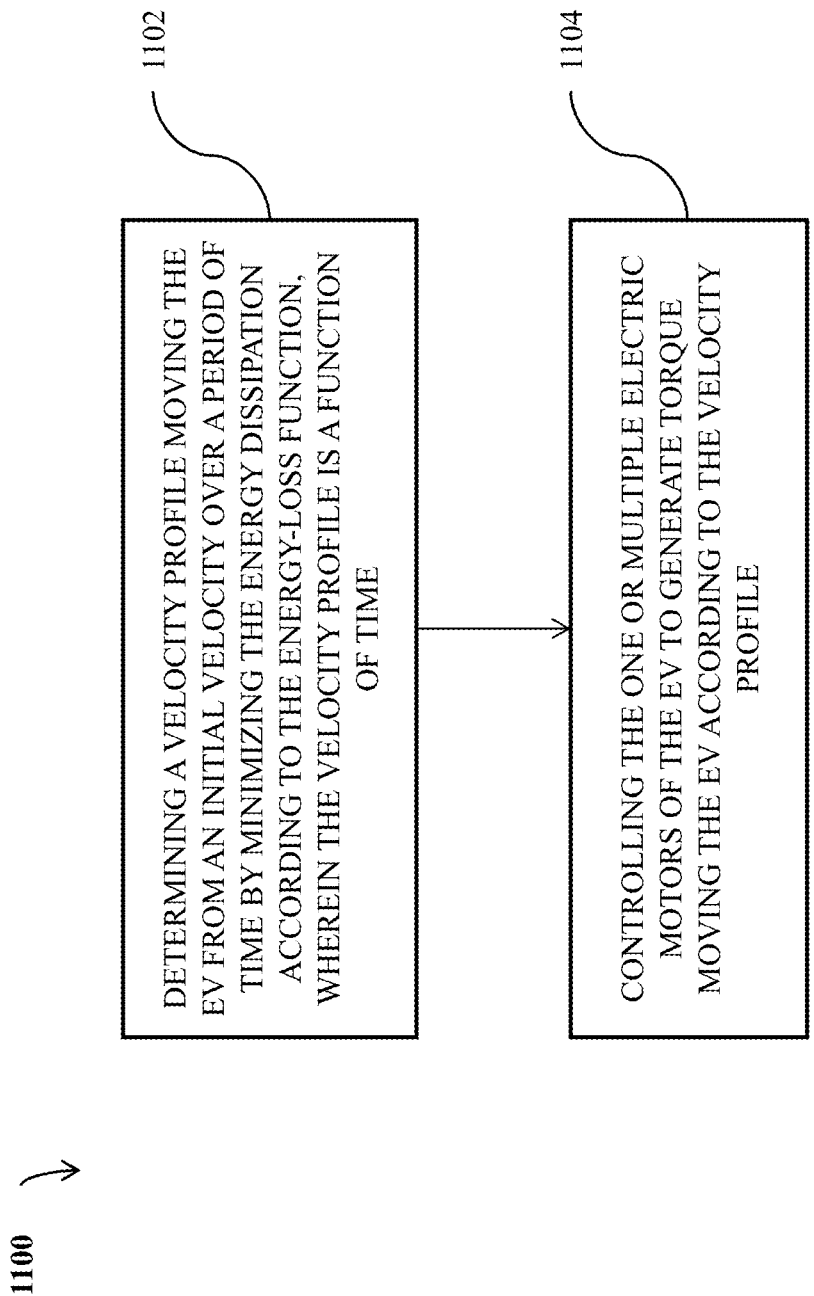
FIG. 11 shows a method flow diagram for controlling a motion of an EV, according to some embodiments of the present disclosure.

FIG. 11 shows a method 1100 flow diagram for controlling a motion of an EV (such as the EV 102), according to some embodiments of the present disclosure. The method 1100 may be performed by the system 100.

At step 1102, the method 1100 includes determining a velocity profile moving the EV from an initial velocity over a period of time by minimizing the energy dissipation according to the energy-loss function, wherein the velocity profile is a function of time. In some embodiments, the initial velocity may be estimated as a current velocity using one or multiple sensors of the EV. The velocity profile may also include a target velocity for the EV that may be determined based on a motion plan of the EV and the period of time allocated for the velocity profile. The target velocity may be at an end of the velocity profile. In some embodiments, the velocity profile may be determined based on at least one or more of a constraint on an average velocity of the velocity profile, a current position and a current velocity of a leading vehicle driving ahead of the EV, and a predicted velocity of the leading vehicle driving ahead of the EV along with the current position and the current velocity.

At step 1104, the method 1100 includes controlling the one or multiple electric motors of the EV to generate torque moving the EV according to the velocity profile.

In some embodiments, the controlling of the one or multiple electric motors include determining, using a model of a longitudinal motion of the EV that relate vehicle acceleration and vehicle velocity with a total torque profile for the one or multiple electric motors to move the EV according to the velocity profile. In some cases, the EV may use a first electric motor (e.g., the first electric motor 316A) and a second electric motor (e.g., the second electric motor 316B). In such cases, the total torque profile is split into a first torque profile and a second torque profile based on a predetermined torque-split function. The first electric motor and the second electric motor are controlled according to the first torque profile and the second torque profile, respectively.

Figure 12:
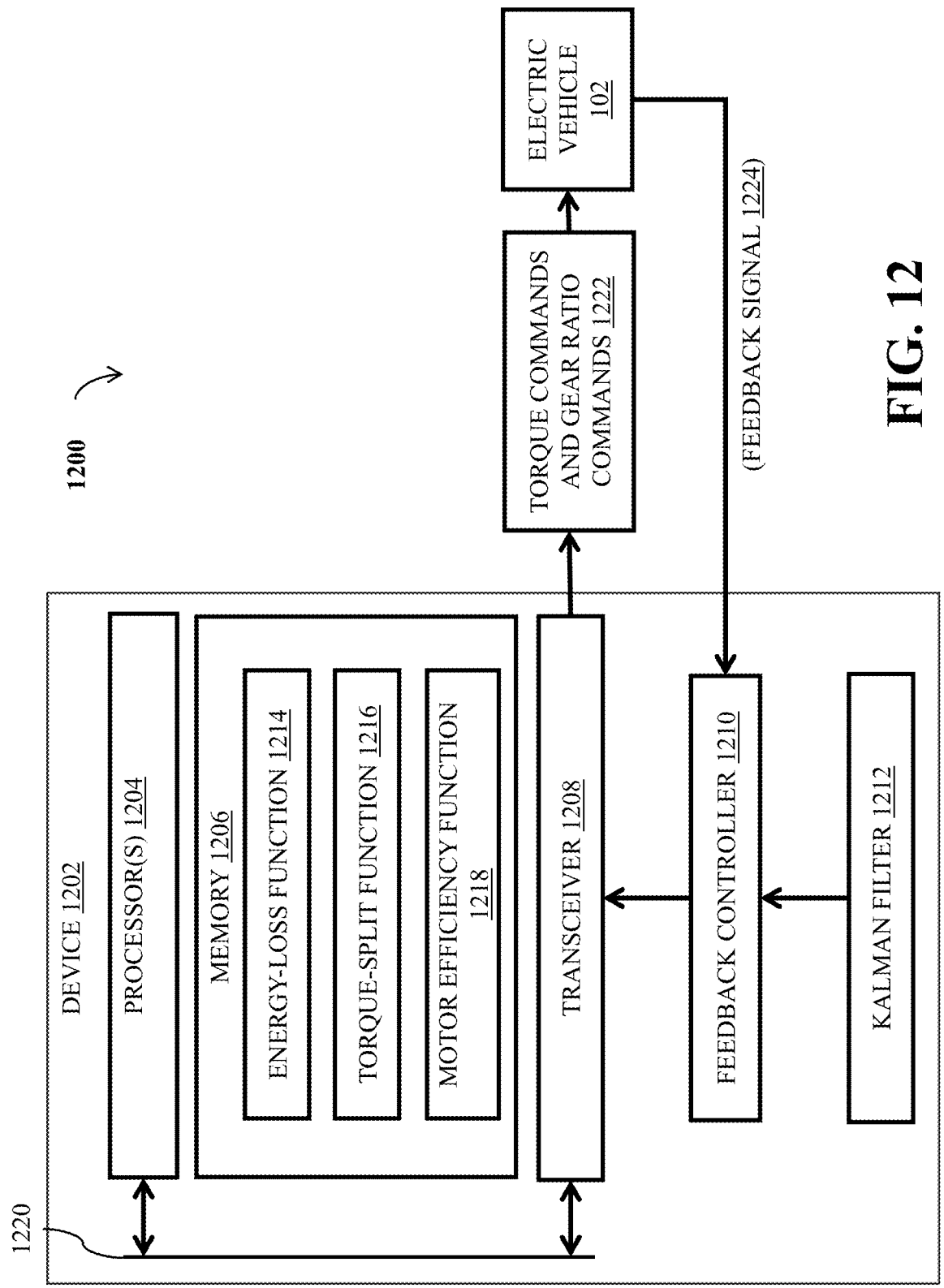
FIG. 12 shows a block diagram of a device for controlling an operation of the system, according to some example embodiments of the present disclosure.

FIG. 12 shows a block diagram 1200 of a device 1202 for controlling an operation of the system 100, according to some embodiments of the present disclosure. In some embodiments, the device 1202 may be integrated with the system 100. In some other embodiments, the device 1202 may be connected to the system 100 via the network 104. The device 1202 may control the system 100 for controlling the motion of the EV 102.

The device 1202 may include at least one processor 1204 and a memory 1206 having instructions stored thereon including executable modules for being executed by the at least one processor 1204 during the controlling of the system 100. The executable modules include a transceiver 1208, a feedback controller 1210 and a Kalman filter 1212.

In one example embodiment, the memory 1206 may be configured to store an energy-loss function 1214, a torque-split function 1216 and a motor efficiency function 1218 for an energy-efficient control of the EV 102. The energy-loss function 1214 corresponds to the energy-loss function 110, the torque-split function 1216 corresponds to the torque-split function 608 and the motor efficiency 1218 corresponds to the motor efficiency function 604. In an alternative example embodiment, any or all of the energy-loss function 1214, the torque-split function 1216, or the motor efficiency function 1218 (referred to herein as the functions 1214, 1216 and 1218) may be accessed from the system 100, via the network 104.

The memory 1206 may be embodied as a storage media such as RANI (Random Access Memory), ROM (Read Only Memory), hard disk, or any combinations thereof. For instance, the memory 1206 may store instructions that are executable by the at least one processor 1204. The at least one processor 1204 may be embodied as a single core processor, a multi-core processor, a computing cluster, or any number of other configurations. The at least one processor 1204 may be operatively connected to the memory 1206 and/or the transceiver 1208 via a bus 1220. In an embodiment, the at least one processor 1204 may be configured to compute a velocity profile (e.g., the velocity profile 302) for the EV 102 using the energy-loss function 1214, and the torque-split function 1216, and/or compute a gear ratio for transmission of the EV 102 using the motor efficiency function 1218.

The computed velocity profile and/or the gear ratio are used to submit a sequence of control inputs to the system 100 via the transceiver 1208 for controlling a motion, such as a longitudinal motion of the EV 102. The sequence of the control inputs changes an initial velocity of the EV 102 to track a specific velocity reference, i.e., a target velocity in the velocity profile. In some example embodiments, the sequence of control inputs may be sent as torque commands and gear ratio commands 1222 to the EV 102 via the transceiver 1208. The transceiver 1208 may be a Radio Frequency (RF) transceiver, or the like.

In some cases, the EV 102 may be driving behind another vehicle, such as the vehicle 402. In such cases, the device 1202 may control the longitudinal motion of the EV 102 by using a feedback signal 1224 that may include a velocity of the EV 102, a position of the EV 102, a velocity of the vehicle 402, a position of the vehicle 402, and the like. The feedback signal 1224 may be received by the feedback controller 1210. The feedback controller 1210 is configured to determine, at each control step, a current control input for controlling the system 100 based on the feedback signal 1222 including a current measurement of a current state of the system 100 by applying a control policy. The control policy may correspond to a method that transforms the current measurement into the current control input based current values of control parameters in a set of control parameters of the feedback controller 1210. The device 1202 may determine an optimized velocity profile based on the feedback signal 1220 and enable the system 100 to control the EV 102 using the optimized velocity profile.

In some embodiments, the Kalman filter 1212 is configured to iteratively update a state of the feedback controller 1210. The state may be defined by the control parameters using a prediction model that predict values of the control parameters subject to process noise and a measurement model updating the predicted values of the control parameters based on the sequence of measurements subject to measurement noise to produce the current values of the control parameters that explain the sequence of measurements according to a performance objective of the system 100, such as an energy-efficient motion control of the EV 102.

Additionally or alternatively, in some embodiments, the Kalman filter is used to update the velocity profile using the energy loss function. Specifically, in response to receiving a feedback signal indicative of a current state of the vehicle tracking the velocity profile, some embodiments execute a Kalman filter to update the velocity profile for the current state of the vehicle improving a likelihood of energy efficiency according to a probabilistic measurement model including the energy loss function. This is advantageous because the energy loss function is deterministic, while the vehicle control is probabilistic in nature. Using the probabilistic measurement model including the deterministic energy loss function modified, for example, with probabilistic noise can reflect the nature of the control, improve the efficiency of determining or updating the velocity profile, and consider imperfections of estimation of the energy loss function.

Figure 13:
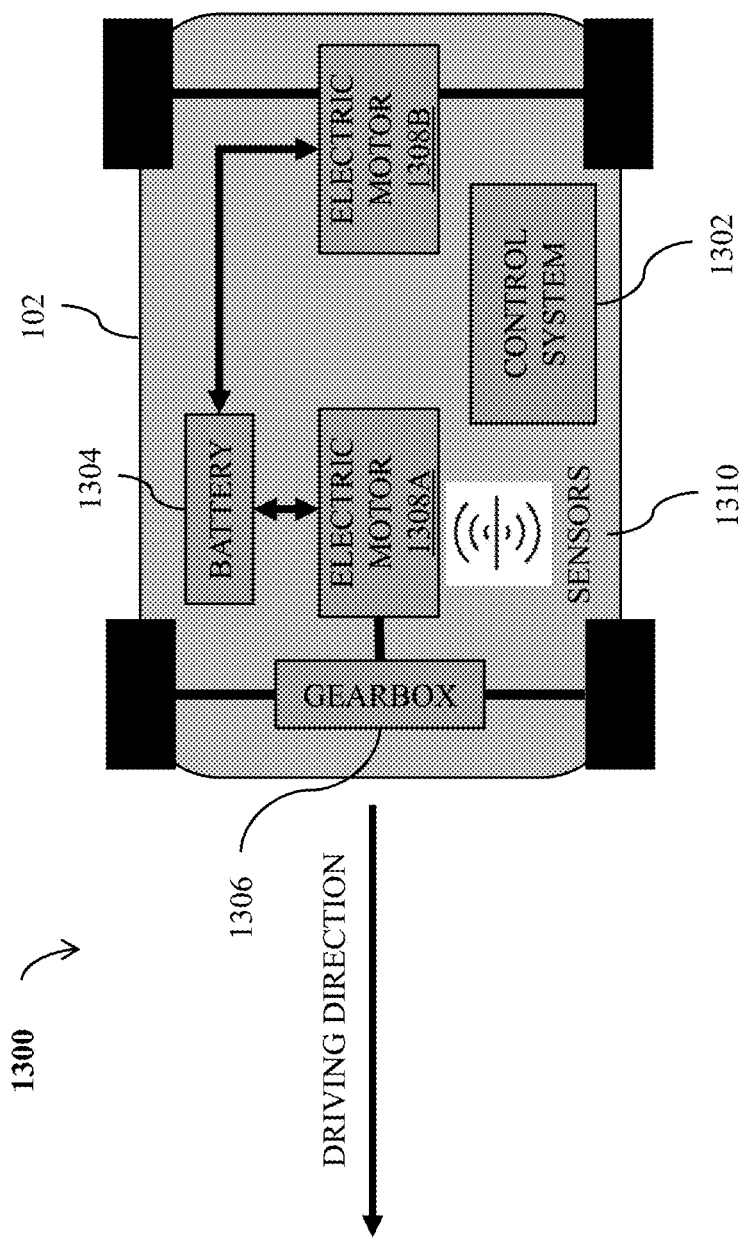
FIG. 13 shows a schematic block diagram of an EV with a control system for controlling the motion of the EV, according to some other example embodiments of the present disclosure.

In some example embodiments, the device 1202 may be embodied within a control system of the EV 102, which is described further with reference to FIG. 13.

FIG. 13 shows a schematic block diagram 1300 of an EV, such as the EV 102 with a control system 1302 for controlling the motion of the EV 102, according to some other example embodiments of the present disclosure. The control system 1302 is embodied within the EV 102. In some example embodiments, the control system 1302 may be connected with the system 100 and the device 1202. In some other example embodiments, the control system 1302 may be embodied with the system 100 and the device 1202.

The EV 102 includes a battery 1304, a gearbox 1306, a first electric motor such as an electric motor 1308A, and a second electric motor such as an electric motor 1308B. The electric motor 1308A is connected to the gearbox 1306 for driving a front axle of the EV 102 (not shown). The electric motor 1308B may use a fixed gear for driving a rear axle of the EV 102.

Further, the EV 102 may include one or multiple sensors collectively referred to as sensors 1310. The sensors 1310 may be any combination of positioning sensors such as global positioning system (GPS), acceleration sensors such as inertial measurement unit (IMU), gyroscope sensors, radar sensors, cameras, or the like. In one example embodiment, the sensors 1310 may be used to measure a velocity and a position of the EV 102. In another example embodiment, the sensors 1310 may be used to measure the velocity and position of the EV 102 as well as velocity and position of a leading vehicle 402 driving ahead of the EV 102.

The control system 1302 may use sensor measurements from the sensors 1310 to compute a velocity profile for the EV 102. The control system 1302 may use the computed velocity profile to output motor torque for electric motor 1308A, motor torque for electric motor 1308B, and a gear ratio for the gearbox 1306. In particular, the control system 1302 determines a total torque profile for the electric motor 1308A and the electric motor 1308B. The total torque profile is split between the electric motor 1308A and the electric motor 1308B. For instance, the total torque profile is split into a first torque and a second torque for corresponding wheels of the electric motor 1308A and the electric motor 1308B. The first torque and the second torque are sent as torque commands for the electric motor 1308A and the electric motor 1308B.

Figure 14:
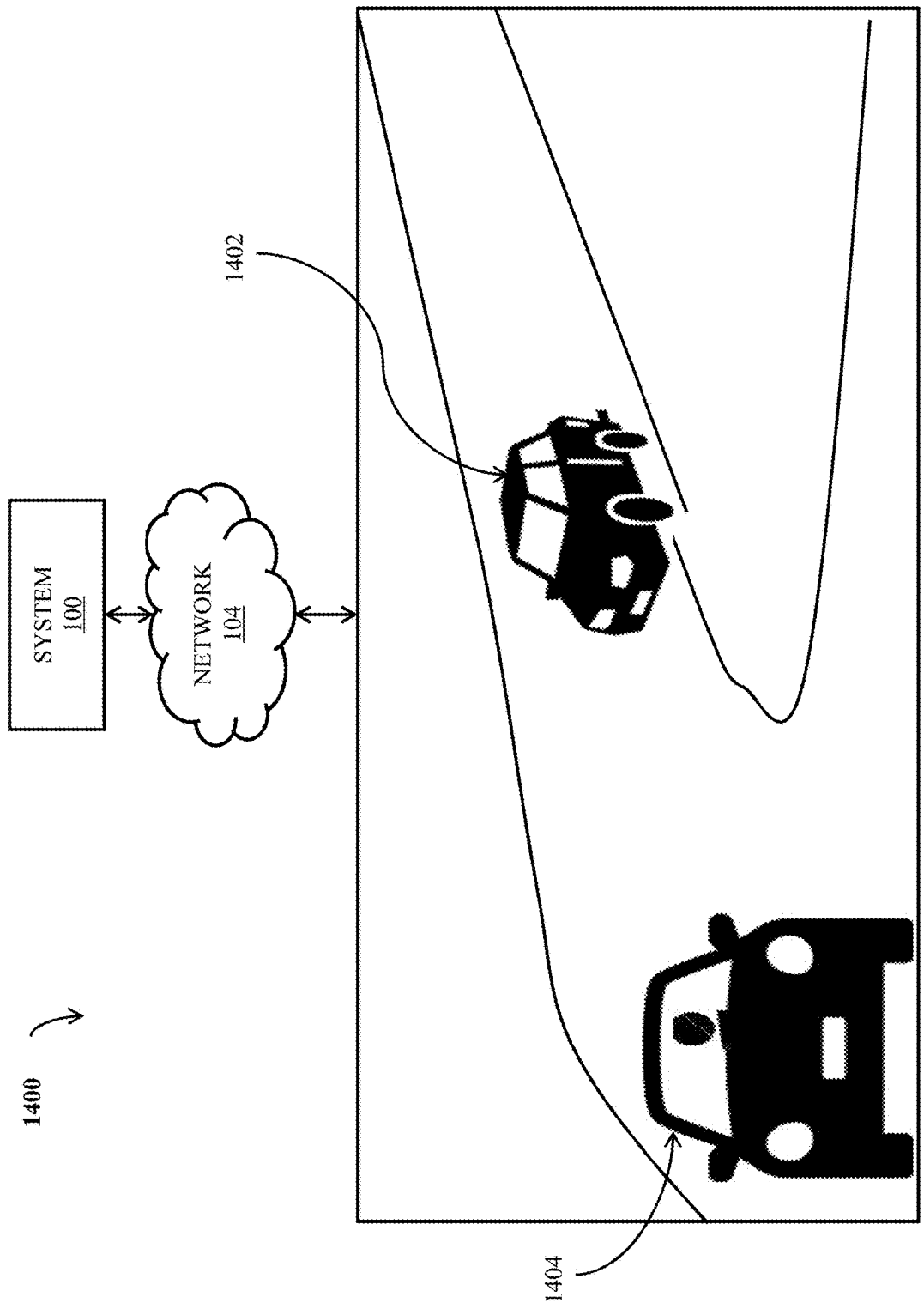
FIG. 14 shows a use case for controlling the motion of an EV, according to some embodiments of the present disclosure.

FIG. 14 shows a use case 1400 for controlling motion of an EV 1402 using the system 100, according to some embodiments of the present disclosure. In an illustrative example scenario, the EV 1402 and a vehicle 1404 are driving on a road. The vehicle 1404 is driving ahead of the EV 1402 as shown in FIG. 14. The EV 1402 is an example of the EV 102 and the vehicle 1404 is an example of the vehicle 402.

The system 100 determines a velocity profile for the EV 1402 to move the EV 1402 from an initial velocity, e.g., 10 km/h to a target velocity, e.g., 60 km/h within a period of time, such as 30 seconds. In order to maintain a minimum distance as a safe distance from the vehicle 1404, the system 100 may determine the velocity profile for the EV 1402 based on one or more constraints (e.g., inequality constraints) on an average velocity of the velocity profile, a current position and a current velocity of the vehicle 1404, and/or a current position, a current velocity, and a predicted velocity within the period of time, such as 30 seconds. For instance, the current velocity of the vehicle 1404 may be at 20 km/h and the predicted velocity of vehicle 1404 is 100 km/h. In some example embodiments, the current position and the current velocity of the vehicle 1404 may be obtained from a feedback signal (e.g., the feedback signal 1222) of the EV 102.

The system 100 then controls one or multiple electric motors of the EV 1402 to generate a total torque profile for moving the EV 1402 based on the computed velocity profile. The total torque profile may be split for corresponding one or multiple electric motors of the EV 1402 using a torque-split function (e.g., the predetermined torque-split function 308). The computed velocity profile may also be used to determine a gear ratio for transmission of the one or multiple electric motors of the EV 1402 using a predetermined motor efficiency function (e.g., the predetermined motor efficiency function 310). The system 100 then minimizes energy consumption of the EV 1402, while following the vehicle 1404 and maintaining the safe distance from the vehicle 1404.

Such optimal control procedure of the system 100 may be efficient for an EV that includes multiple electric motors with different specifications, while leveraging strengths of the different electric motors to improve the overall energy-efficiency of the EV.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The above-described embodiments of the present disclosure may be implemented in any of numerous ways. For example, the embodiments may be implemented using hardware, software or a combination thereof. When implemented in software, the software code may be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Therefore, it is the object of the appended claims to cover all such variations and modifications as come within the true spirit and scope of the present disclosure.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. A method for controlling a motion of an electric vehicle (EV), wherein the method uses a processor coupled to a memory storing an energy-loss function mapping values of acceleration and velocity of the EV to energy dissipation of the EV resulting from controlling one or multiple electric motors of the EV to move the EV at corresponding acceleration and velocity values, wherein the processor is configured to execute instructions stored in the memory for implementing the method, wherein the instructions, when executed by the processor carry out steps of the method, comprising:

determining a velocity profile moving the EV from an initial velocity over a period of time by minimizing the energy dissipation according to the energy-loss function, wherein the velocity profile is a function of time, and wherein the energy-loss function corresponds to a pseudo-convex function having a global minimum, and the energy-loss function is determined based on at least the model of the longitudinal motion, the predetermined torque-split function, and the predetermined motor efficiency function; and controlling the one or multiple electric motors of the EV to generate a torque for moving the EV according to the velocity profile.

2. The method of claim 1, wherein the controlling of the one or multiple electric motors comprises:

determining, using a model of the longitudinal motion of an EV relating vehicle acceleration and vehicle velocity with a total torque profile for the one or multiple electric motors to move the EV according to the velocity profile; and controlling the one or multiple electric motors based on the determined torque profile.

3. The method of claim 2, wherein the one or multiple electric motors include a first electric motor of the EV and a second electric motor of the EV, further comprising allocating the torque profile into a first torque profile and a second torque profile based on a predetermined torque-split function, the predetermined torque-split function allocates the torque profile at least between the first electric motor and the second electric motor; and controlling the first electric motor and the second electric motor according to the first torque profile and the second torque profile, respectively.

4. The method of claim 3, further comprising:

determining a gear ratio for a transmission of the one or multiple electric motors using a predetermined motor efficiency function; and controlling the transmission based on the determined gear ratio.

5. The method of claim 4, wherein the predetermined motor efficiency function is learned using a kernel-based regression that fits data of an efficiency map of the first electric motor relating the efficiency of the first electric motor to a motor speed and a motor torque of the first electric motor.

6. The method of claim 5, wherein the predetermined torque-split function is learned using the predetermined motor efficiency function of the one or multiple electric motors.

7. The method of claim 1, wherein the energy-loss function is learned using a kernel-based regression that fits data of one or multiple efficiency maps of the one or multiple electric motors to the energy-loss function based on a model of drivetrain losses of the one or multiple electric motors and a model of driving losses caused by aerodynamics and rolling resistance of the EV, wherein the model of drivetrain losses corresponds to efficiencies of a motor mode of the EV and a generator mode of the EV, and wherein the motor mode corresponds to usage of electric energy for the vehicle acceleration and the generator mode corresponds to regeneration of the electric energy from the vehicle acceleration and deceleration of the EV.

8. The method of claim 1, further comprising optimizing the energy-loss function based on a gradient-descent method.

9. The method of claim 7, further comprising utilizing the total torque profile to operate the one or multiple electric motors in at least the motor mode and the generator mode of the EV.

10. The method of claim 1, further comprising:
determining the initial velocity as a current velocity estimated using one or multiple sensors of the EV; and
determining a target velocity based on a motion plan of the EV and the period of time allocated for the velocity profile, wherein the target velocity is at end of the velocity profile.

11. The method of claim 10, further comprising recomputing the velocity profile and the initial velocity at every sampling time step for the controlling of the motion of the EV.

12. The method of claim 10, wherein the recomputing the velocity profile further comprises:
receiving a feedback signal indicative of a current state of the vehicle tracking the velocity profile; and
executing a Kalman filter to update the velocity profile for the current state of the vehicle improving a likelihood of energy efficiency according to a probabilistic measurement model including the deterministic energy loss function.

13. The method of claim 9, further comprising determining the velocity profile based on at least one or more of:
a constraint on an average velocity of the velocity profile;
a current position and a current velocity of a leading vehicle driving ahead of the EV; and
a predicted velocity over a period of time of the leading vehicle driving ahead of the EV along with the current position and the current velocity.

14. A system for controlling a motion of an electric vehicle (EV), comprising:
a processor coupled to a memory storing an energy-loss function mapping values of acceleration and velocity of the EV to energy dissipation of the EV resulting from controlling one or multiple electric motors of the EV to move the EV at corresponding acceleration and velocity values, wherein the processor is configured to execute stored instructions in the memory to cause the system to:
determine a velocity profile moving the EV from an initial velocity over a period of time by minimizing the energy dissipation according to the energy-loss function, wherein the velocity profile is a function of time, and wherein the energy-loss function corresponds to a pseudo-convex function having a global minimum, and the energy-loss function is determined based on at least the model of the longitudinal motion, the predetermined torque-split function, and the predetermined motor efficiency function; and control the one or multiple electric motors of the EV to generate a torque for moving the EV according to the velocity profile.

15. The system of claim 14, wherein to control the one or multiple electric motors, the processor is configured to execute stored instructions in the memory to cause the system to:
determine, using a model of the longitudinal motion of an EV relating vehicle acceleration and vehicle velocity with a total torque profile for the one or multiple electric motors to move the EV according to the velocity profile; and
control the one or multiple electric motors based on the determined torque profile.

16. The system of claim 15, wherein the one or multiple electric motors include a first electric motor of the EV and a second electric motor of the EV, and wherein the processor is further configured to execute stored instructions in the memory to cause the system to:
allocate the torque profile into a first torque profile and a second torque profile based on a predetermined torque-split function, the predetermined torque-split function allocates the torque profile at least between the first electric motor and the second electric motor; and
control the first electric motor and the second electric motor according to the first torque profile and the second torque profile, respectively.

17. The system of claim 16, wherein the processor is further configured to execute stored instructions in the memory to cause the system to:
determine a gear ratio for a transmission of the one or multiple electric motors using a predetermined motor efficiency function; and
control the transmission based on the determined gear ratio.

18. The system of claim 16, wherein the predetermined motor efficiency function is learned using a kernel-based regression that fits data of an efficiency map of the first electric motor relating the efficiency of the first electric motor to a motor speed and a motor torque of the first electric motor, and wherein the predetermined torque-split function is learned using the predetermined motor efficiency function of the one or multiple electric motors.

19. The system of claim 14, wherein the energy-loss function is learned using a kernel-based regression that fits data of one or multiple efficiency maps of the one or multiple electric motors to the energy-loss function based on a model of drivetrain losses of the one or multiple electric motors and a model of driving losses caused by aerodynamics and rolling resistance of the EV, wherein the model of drivetrain losses corresponds to efficiencies of a motor mode of the EV and a generator mode of the EV, and wherein the motor mode corresponds to usage of electric energy for the vehicle acceleration and the generator mode corresponds to regeneration of the electric energy from the vehicle acceleration and deceleration of the EV.

* * * * *